(12) United States Patent
   Bokotey

(10) Patent No.: US 8,935,396 B2
(45) Date of Patent: *Jan. 13, 2015

(54) NETWORK VISUALIZATION SYSTEM AND METHOD OF USING SAME

(71) Applicant: Dmitry Bokotey, Mequon, WI (US)

(72) Inventor: Dmitry Bokotey, Mequon, WI (US)

(73) Assignee: nuPSYS, Inc., Menlo Park, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/297,266

(22) Filed: Jun. 5, 2014

(65) Prior Publication Data

US 2014/0317514 A1     Oct. 23, 2014

Related U.S. Application Data

(63) Continuation of application No. 14/158,300, filed on Jan. 7, 2014, now Pat. No. 8,782,265.

(60) Provisional application No. 61/782,296, filed on Mar. 14, 2013.

(51) Int. Cl.
   *G06F 15/16* (2006.01)
   *H04L 12/24* (2006.01)
   *G06F 3/0481* (2013.01)
   *G06F 3/0484* (2013.01)
   *G06F 12/00* (2006.01)

(52) U.S. Cl.
   CPC .............. *H04L 41/22* (2013.01); *G06F 3/0481* (2013.01); *G06F 3/04815* (2013.01); *G06F 3/04845* (2013.01)
   USPC .......................................... 709/224; 709/229

(58) Field of Classification Search
   USPC ................................. 709/203, 223–229, 250
   See application file for complete search history.

(56) References Cited

U.S. PATENT DOCUMENTS

| | | | |
|---|---|---|---|
| 8,200,796 B1 | 6/2012 | Margulis | |
| 2001/0042118 A1 | 11/2001 | Miyake et al. | |
| 2003/0149765 A1* | 8/2003 | Hubbard et al. | 709/224 |
| 2004/0088405 A1 | 5/2004 | Aggarwal | |
| 2005/0075839 A1 | 4/2005 | Rotheroe | |
| 2005/0091482 A1 | 4/2005 | Gray et al. | |
| 2006/0019679 A1 | 1/2006 | Rappaport et al. | |
| 2007/0177804 A1 | 8/2007 | Elias et al. | |
| 2007/0219953 A1 | 9/2007 | Mak | |
| 2007/0296558 A1 | 12/2007 | Jung et al. | |
| 2008/0072264 A1* | 3/2008 | Crayford | 725/86 |
| 2008/0250356 A1 | 10/2008 | Johns | |
| 2008/0301743 A1 | 12/2008 | Vrielink et al. | |
| 2009/0245122 A1 | 10/2009 | Maiocco et al. | |
| 2009/0287652 A1 | 11/2009 | Chen et al. | |
| 2010/0110932 A1 | 5/2010 | Doran et al. | |
| 2010/0131638 A1 | 5/2010 | Kondamuru | |

(Continued)

OTHER PUBLICATIONS

ISA/US, Notification of the International Search Report and The Written Opinion of the International Searching Authority, or the Declaration, Jun. 17, 2014, 8 pgs, USA.

*Primary Examiner* — Zarni Maung
(74) *Attorney, Agent, or Firm* — Ryan M. Corbett

(57) ABSTRACT

A network visualization system is provided. The network visualization system may include a monitoring server that discovers devices in a client network, and a client application including a discovery controller and a rendering unit. The discovery controller may receive a list of discovered devices that were discovered by he monitoring server, and the rendering unit may render the discovered devices using DirectX.

28 Claims, 32 Drawing Sheets

(56) References Cited

U.S. PATENT DOCUMENTS

| | | | |
|---|---|---|---|
| 2012/0246144 A1* | 9/2012 | Moricz | 707/711 |
| 2013/0061033 A1 | 3/2013 | Kim et al. | |
| 2013/0215124 A1* | 8/2013 | Master et al. | 345/502 |
| 2013/0254417 A1* | 9/2013 | Nicholls | 709/231 |
| 2014/0059443 A1 | 2/2014 | Tabe | |

* cited by examiner

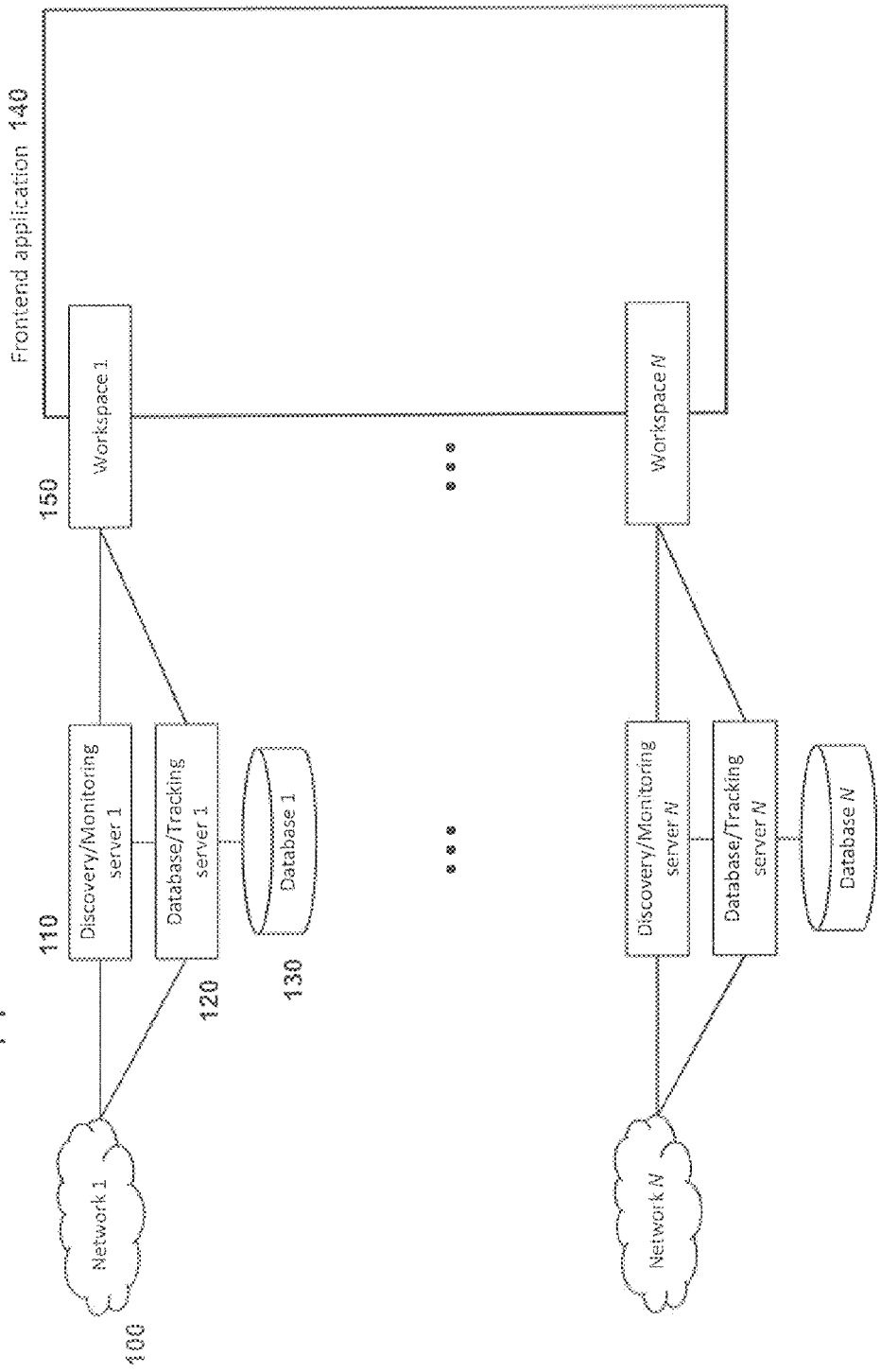

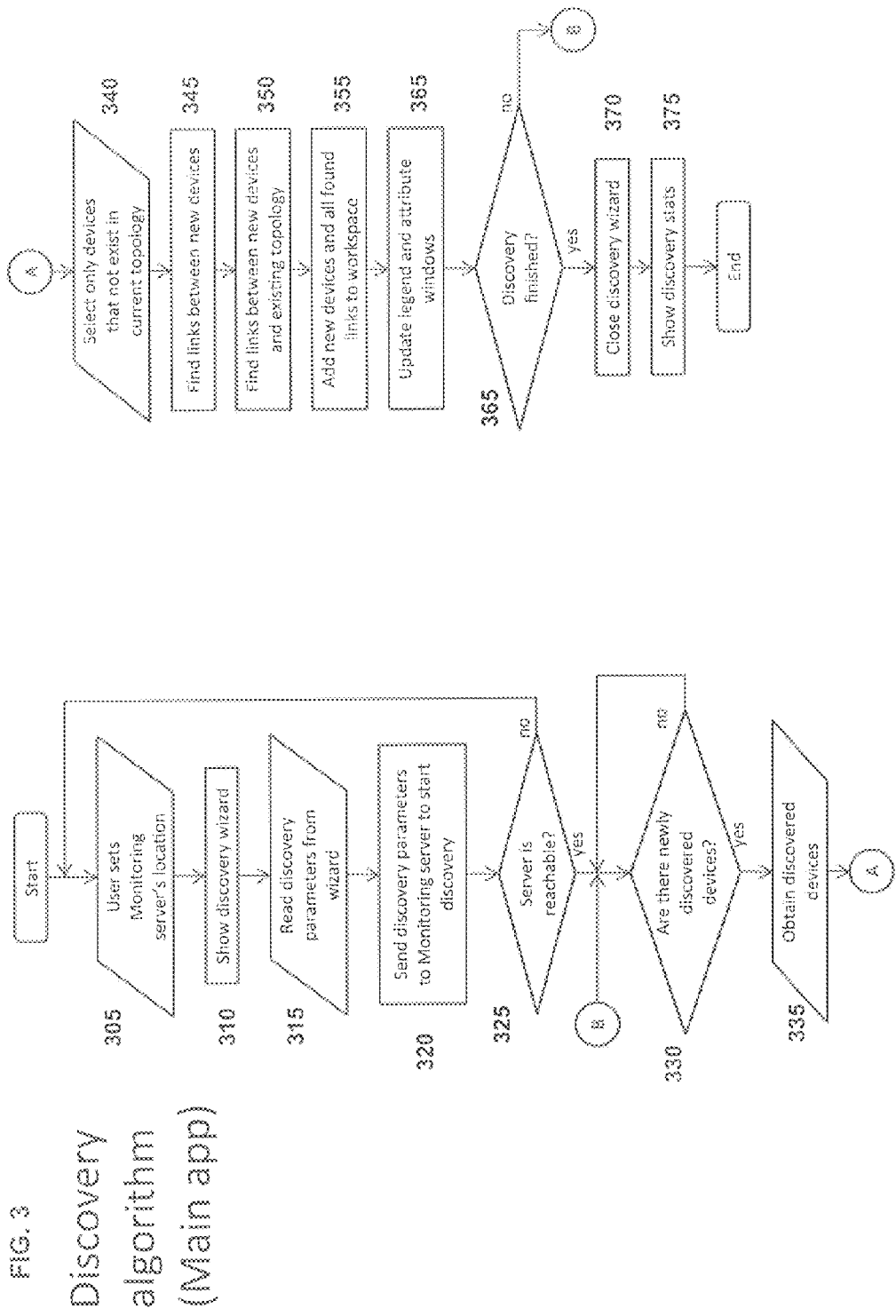

Discovery algorithm (worker thread)

Login algorithm

Login algorithm uses multiple credentials specified by user in discovery parameters. In case of successful login matching credentials are stored for the future querying of a device.

Monitoring algorithm (BGP)

Monitoring states of discovered BGP neighbors. Actual device querying occurs in Monitoring server and results are pulled by Main application in specified periods of time. Lines in workspace that represent BGP neighbors are flashed after each update.

FIG. 14

Main window layout

| 1405 | Ribbon | |
|---|---|---|
| 1410 Workspaces grid (Shows shortcuts to all workspaces) | Attribute window 1415<br>Contains following tabs (tables):<br>Design mode, Common inventory, Discovery mode, Device monitoring, Connection info, BGP links, Latency map, High availability monitor, HSRP, Tracking center, Config management | 1420 Globe control with live status |
| | | 1425 Picture-in-Picture thumbs |
| Drawing stencils 1455 | Device tree view 1450 | Selected workspace area (WPF or DX) 1460 |
| | | 1430 Workspace preview (mini map) |
| Legend window 1445 | | 1435 Search window |
| Status bar 1440 | | |

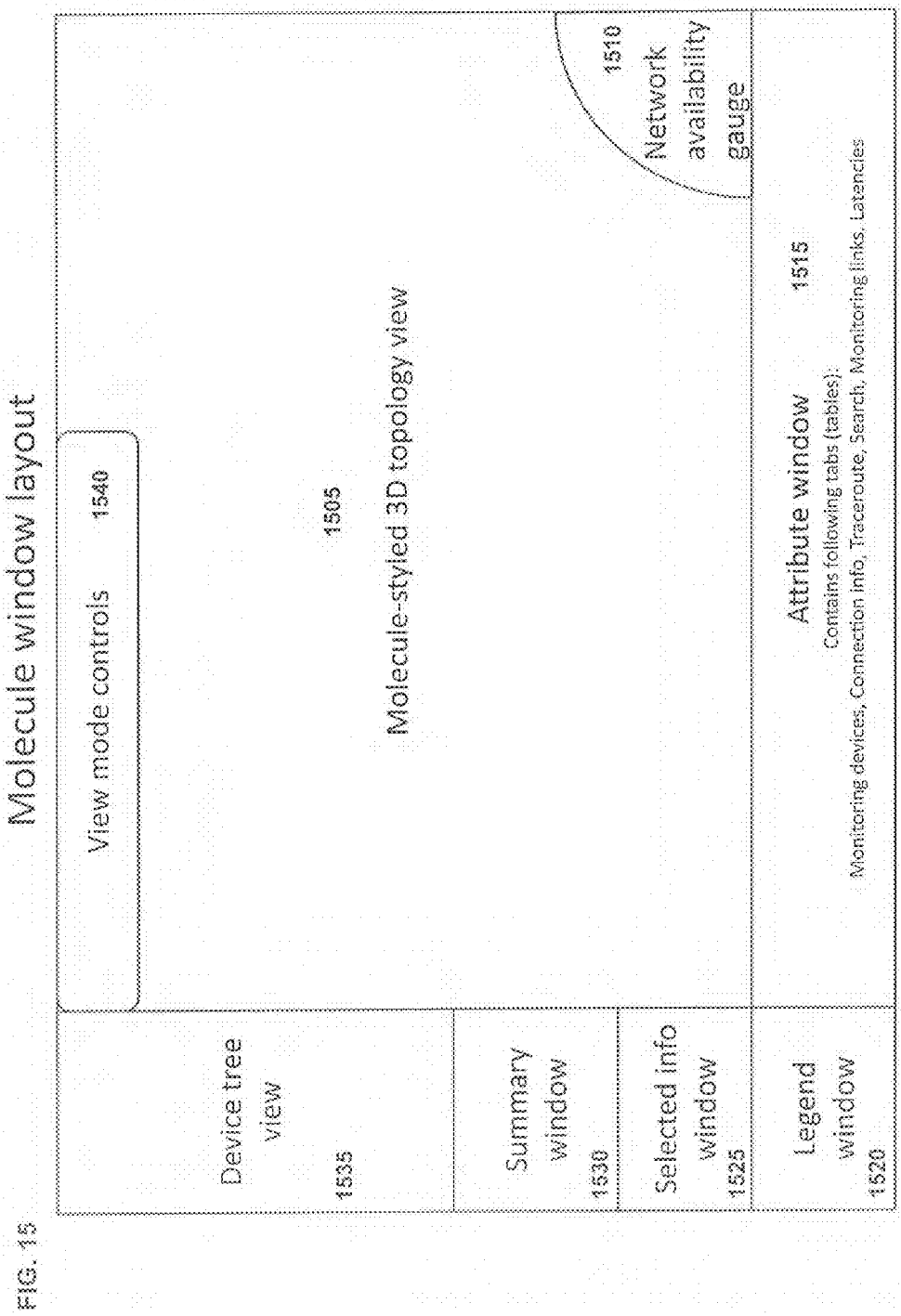

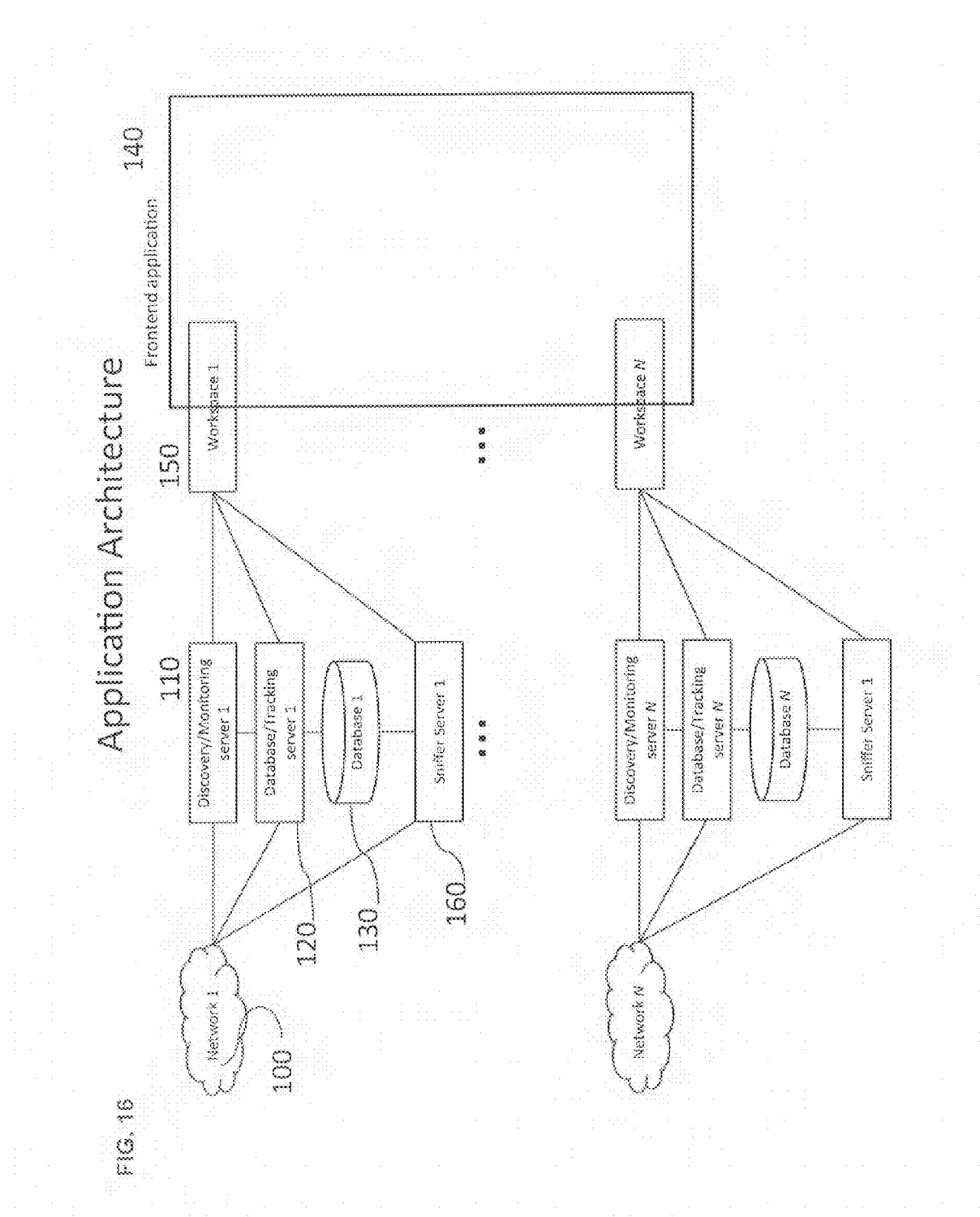

NETWORK VISUALIZATION SYSTEM AND METHOD OF USING SAME

PRIORITY CLAIM

This application is a continuation of U.S. patent application Ser. No. 14/158,300 filed Jan. 17, 2014, which claims the benefit of U.S. Provisional Patent Application No. 61/782,296 filed Mar. 14, 2013, which is incorporated herein by reference in its entirety.

BACKGROUND

Methods and apparatuses consistent with the exemplary embodiments relate to visualizing and monitoring computer networks and the component devices connected to the network. In particular, the exemplary embodiments relate to improvements in visualizing large and complex networks.

Methods and apparatuses of the related art allowed a user to visualize a computer a network, but did so in a way that made it difficult to for the user to understand the status of the network and its components. This is especially true for large and complex networks, where the number of components created an overwhelming amount of information that is not useful to the user und strained hardware resources.

SUMMARY

According to an aspect of one or more exemplary embodiments, there is provided a system for monitoring a network of connected devices and providing a visualization of the network to the user. A system according to one or more exemplary embodiments may include a client network, a monitoring server that discovers devices connected to the client network and monitors the client network, and a client application that manages discovery of the networked devices and visualization of the network. The system may also include a database server that stores the network topology of devices discovered by the monitoring server.

The client application may include a discovery controller and a DX renderer. The discovery controller may include a data receiver that receives data, such as a list of networked devices, from the monitoring server. The discovery controller may also include a discovery algorithm that controls the process of discovering the devices on the client network. The DX render may include a rendering controller that receives information from the discovery controller regarding the discovered devices on the network. The DX renderer may also include a renderer that generates a visualization of the network, including the networked devices, that enables a user to effectively monitor the status of the network and networked devices.

The system may include a plurality of monitoring servers that discover devices in a corresponding plurality of client networks simultaneously. The DX renderer may graphically render the devices discovered in the plurality of client networks in a plurality of windows. the monitoring servers may determine a CPU usage of a device to be discovered, and discover the device if the CPU usage is below a CPU usage threshold.

The system may also include one or more device databases that store information relating to a corresponding device, and a master database that stores all the information contained in the one or more device databases. The monitoring server may also determine the physical location of the devices discovered in the client network. The client application may display an inventory of discovered devices based on the physical location of the discovered devices.

BRIEF DESCRIPTION OF THE DRAWINGS

FIG. 1 is a block diagram showing the high-level architecture of a network visualization system according to an exemplary embodiment.

FIG. 3 is a flowchart of a discovery algorithm operating within the client application according to an exemplary embodiment.

FIGS. 15 and 15A illustrate a molecule window layout of a rendered workspace according to an exemplary embodiment.

FIG. 16 is a block diagram showing the high-level architecture of a network visualization system according to an exemplary embodiment.

DETAILED DESCRIPTION OF EXEMPLARY EMBODIMENTS

Figure 2A:
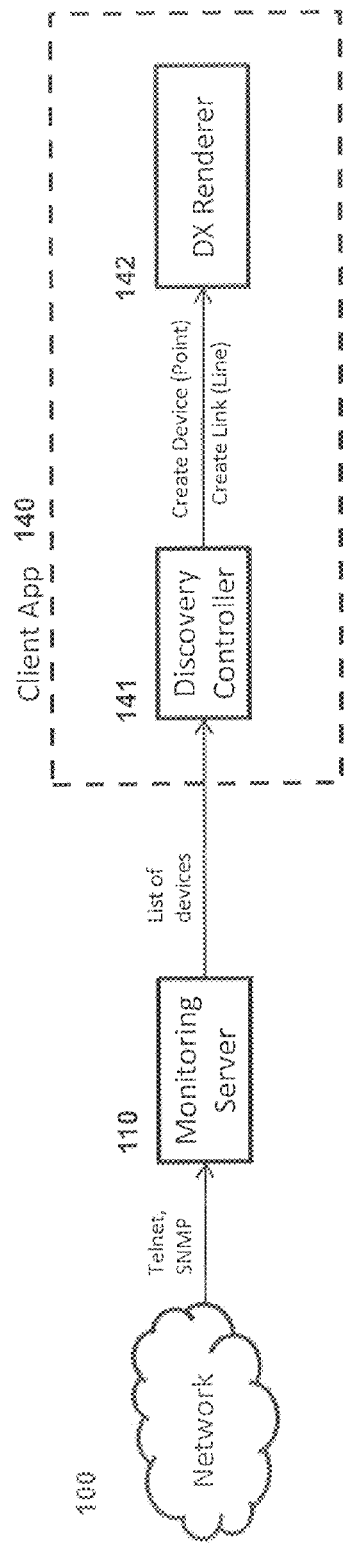
FIGS. 2A and 2B are block diagrams showing the high-level architecture of a network visualization system according to an exemplary embodiment.

Reference will now be mode in detail to the following exemplary embodiments, which are illustrated in the accompanying drawings, wherein like reference numerals refer to like elements throughout.

The exemplary embodiments may be embodied in various forms without being limited to the exemplary embodiments set forth herein. Descriptions of well-known parts are omitted for clarity.

FIG. 1 is an architectural diagram of a network visualization system according to an exemplary embodiment. Referring to FIG. 1, a network visualization system according to an exemplary embodiment may include client networks 1 through N 100, discovery/monitoring servers 1 through N 110, database/tracking servers 1 through N 120, databases 1 through N 130, and client (or "front end") application 140, which includes workspaces 1 through N 150. The discovery/monitoring servers 1 through N 110 are responsible for querying actual devices in client networks 1 through N 100, respectively, and transmitting the results to the client application 140. The database/tracking servers 1 through N 120 are responsible for storing network topology, monitoring data, and device tracking, for the corresponding client network 100. Databases 1 through N 130 store data relating to the discovered devices and the client network 100.

Although in the exemplary architecture of FIG. 1 each discovery/monitoring server 110 is responsible for discovery and monitoring of its corresponding client network 100, the exemplary embodiment is not limited to one-to-one correspondence. Multiple discovery/monitoring servers 110 may be used to discover and monitor devices on a single client network 100, or a single discovery/monitoring server 110 may discover and monitor devices on multiple client networks 100.

The discovery/monitoring servers 110 may comprise a conventional general-purpose computer, a special-purpose computer, a distributed computer, or any other type of computer or server. The discovery/monitoring servers 110 may comprise one or more processors, such as a single central processing unit (CPU), or a plurality of processing units, commonly referred to as a parallel processing environment, which may execute instructions to practice the various aspects of the exemplary embodiments described herein.

Moreover, the discovery/monitoring servers 110 may be physical or virtual servers. For example, each discovery/monitoring server 110 may be a physically separate server, or multiple visual servers may be contained within one physical device.

Figure 2B:
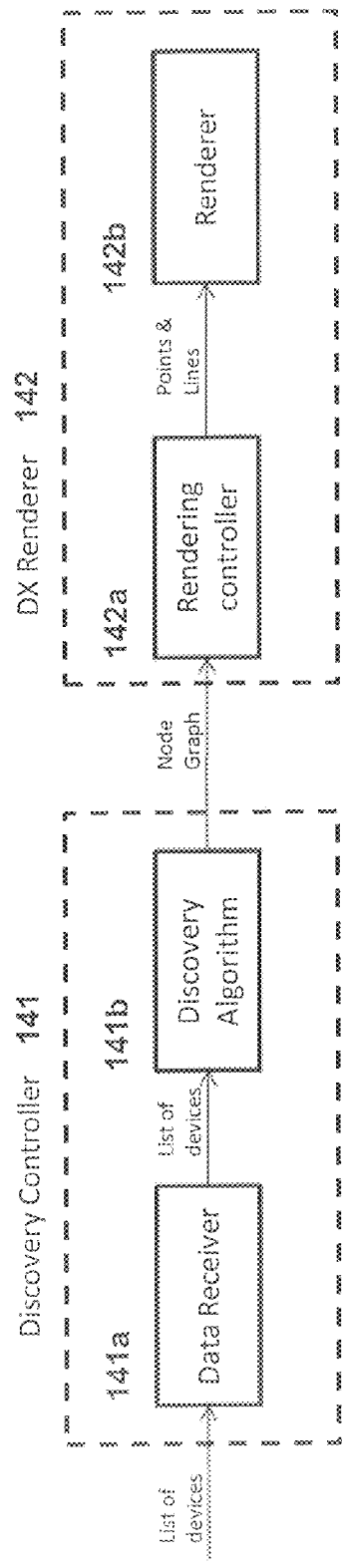

FIGS. 2A and 2B are block diagrams that further illustrate the structure of the client application 140 according to an exemplary embodiment. Client application 140 may be a local client residing on a user's workstation, or client application 140 may be web-based, allowing a user to access the application via the Internet. For example, client application 140 may be thin-client compliant, an may operate on a mobile device, tablet, etc. Referring to FIG. 2A, the client application 140 may include a discovery controller 141 and a DX renderer or rendering unit 142. The discovery controller 141 instructs the monitoring server 110 to perform discovery of devices on the client network 100. The discovery controller 141 receives the results of the discovery process and transmits those results to the DX renderer 142, which renders a visualization of the client network 100. The DX renderer 142 may render a visualization of client network 100 by itself, or in combination with one or more other client networks 1 through N 100. The DX render 142 may render the visualization of client network 100 using, for example, DirectX®, HTML5, or any other suitable visualization technique.

The DX renderer 142 may render the visualization as a stereoscopic representation of the client network 100. To provide a stereoscopic image, the DX renderer 142 may render two images—one for the user's right eye and one for the user's left eye—which the user's brain combines to give the appearance of a three dimensional (3-D) image. For example, DX renderer 142 may render the visualization using time-sequential stereoscopy, in which the two images are alternately displayed; or spatial stereoscopy, in which the two images are displayed at the same time, with each image directed the appropriate eye of the user. In addition, the DX renderer 142 may render the stereoscopic visualization using a multi-layer liquid crystal display, as described in, for example, U.S. Pat. No. 8,250,242, the disclosure of which is incorporated herein by reference in its entirety.

The DX renderer or rendering unit 142 may include, but is not limited to, a software or hardware component, such as a Field Programmable Gate Array (FPGA) or an Application Specific Integrated Circuit (ASIC), which performs certain tasks, and may include multiple processors. DX renderer may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components may be combined into fewer components or further separated into additional components.

Referring to FIG. 2B, the discovery controller 141 may include a data receiver 141a and a discovery algorithm 141b. The DX renderer 142 may include a rendering controller 142a and a renderer 142b. The data receiver 141a receives a list of discovered devices from the monitoring server 110 and provides the list of discovered devices to the discovery algorithm 141b, which generates a node graph mapping all of the discovered devices. The node graph is transmitted to the rendering controller 142a of the DX render 142, which generates a point corresponding to each discovered device, the lines representing the connections between the discovered devices. The points and lines generated by the rendering controller 142a are then transmitted to the renderer 142b, which renders a visualization of the client network 100.

FIG. 3 is a flowchart of the discovery algorithm 141b operating within client application 140 according to an exemplary embodiment. Referring to FIG. 3, the process begins at step 305 with the user setting the location of the monitoring server 110. Once the monitoring server 110 location is entered, a discovery wizard is shown in step 310, which includes various discovery parameters. For example, the discovery wizard may include various discovery modes such as, without limitation, CDP, Telnet, SSH, ARP, CAM, Ping, Routing, and DNS. In step 315, the discovery parameters are selected from the discovery wizard. In step 320, the discovery parameters are transmitted to the monitoring server 110 to start discovery. The process checks whether the monitoring server 110 is reachable in step 325. If the monitoring server 110 is not reachable in step 325, the process goes back to step 305, where the user sets the location of the monitoring server 110. If the monitoring server 110 is reachable in step 325, the process determines in step 330 whether there are newly discovered devices. If it is determined that there are no newly discovered devices in step 330, the process continues checking until a newly discovered device is detected. If it is determined in step 330 that a newly discovered device has been detected, the newly discovered devices are obtained in step 335. In step 340, only the newly discovered devices that do not exist in the current topology are selected. In step 345, the links between the newly discovered devices are found. In step 350, the links between the newly discovered devices and the existing topology are found. At step 355, the newly discovered devices and the found links associated with the newly discovered devices are added to the workspace for the client network. In step 360, the legend and attribute windows (described below) of the workspace are updated. At step 365, it is determined whether discovery is finished. If it is determined that discovery is not finished, the process reverts to step 330, where the process checks for newly discovered devices. If it is determined that discovery is finished in step 365, the discovery wizard is closed at step 370. In step 375, the discovery stars are shown describing information relating to the discovered devices, and the process ends.

The discovery process may be a partitioned discovery process in which discovery of multiple networks is performed simultaneously. A user is therefore able to centrally manage multiple networks more efficiently by discovering devices in each of the networks simultaneously.

Figure 4:
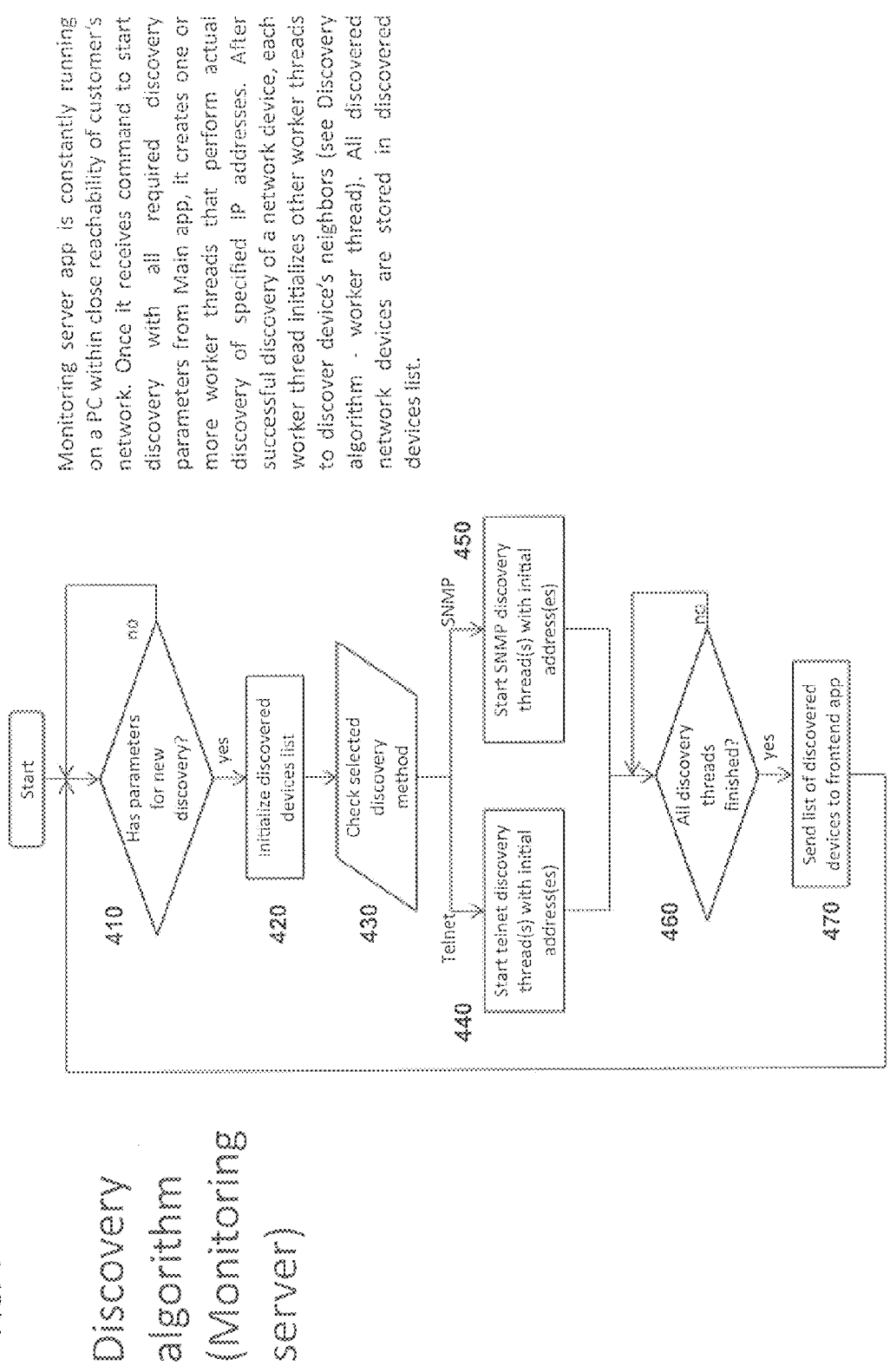
FIG. 4 is a flowchart of a discovery process performed by the monitoring server according to an exemplary embodiment.

FIG. 4 is a flowchart of the discovery process performed by the monitoring server 100 according to an exemplary embodiment. Referring to FIG. 4, when the monitoring server 110 receives a command to begin discovery from the client application, the process begins by determining in step 410 whether the discovery parameters have been received from the client application. If it is determined that the discovery parameters have not been received, the process continues to check until the discovery parameters have been received. If it is determined in step 410 that the discovery parameters have been received, the monitoring server 110 initializes a discovered devices list in step 420. In step 430, the monitoring server 110 determines which discovery method has been selected. If Telnet discovery has been selected, in step 440 one or more Telnet discovery threads are started with one or more initial addresses. It SNMP discovery has been selected, in step 450 one or more SNMP discovery threads are started with one or more initial addresses. The discovery threads perform actual discovery of specified IP addresses, as explained further below. After successful discovery of a network device, each discovery thread initializes other discovery threads to discover any neighboring devices. All discovered network devices are stored in the discovered devices list.

In step 460, the process determines whether all discovery threads are finished. If it is determined that all the discovery threads are not finished, the process continues checking until all of the discovery threads are finished. If it is determined that all of the discovery threads are finished in step 460, the list of discovered devices is sent to the client application in step 470, and the process returns to step 410.

Figure 5:
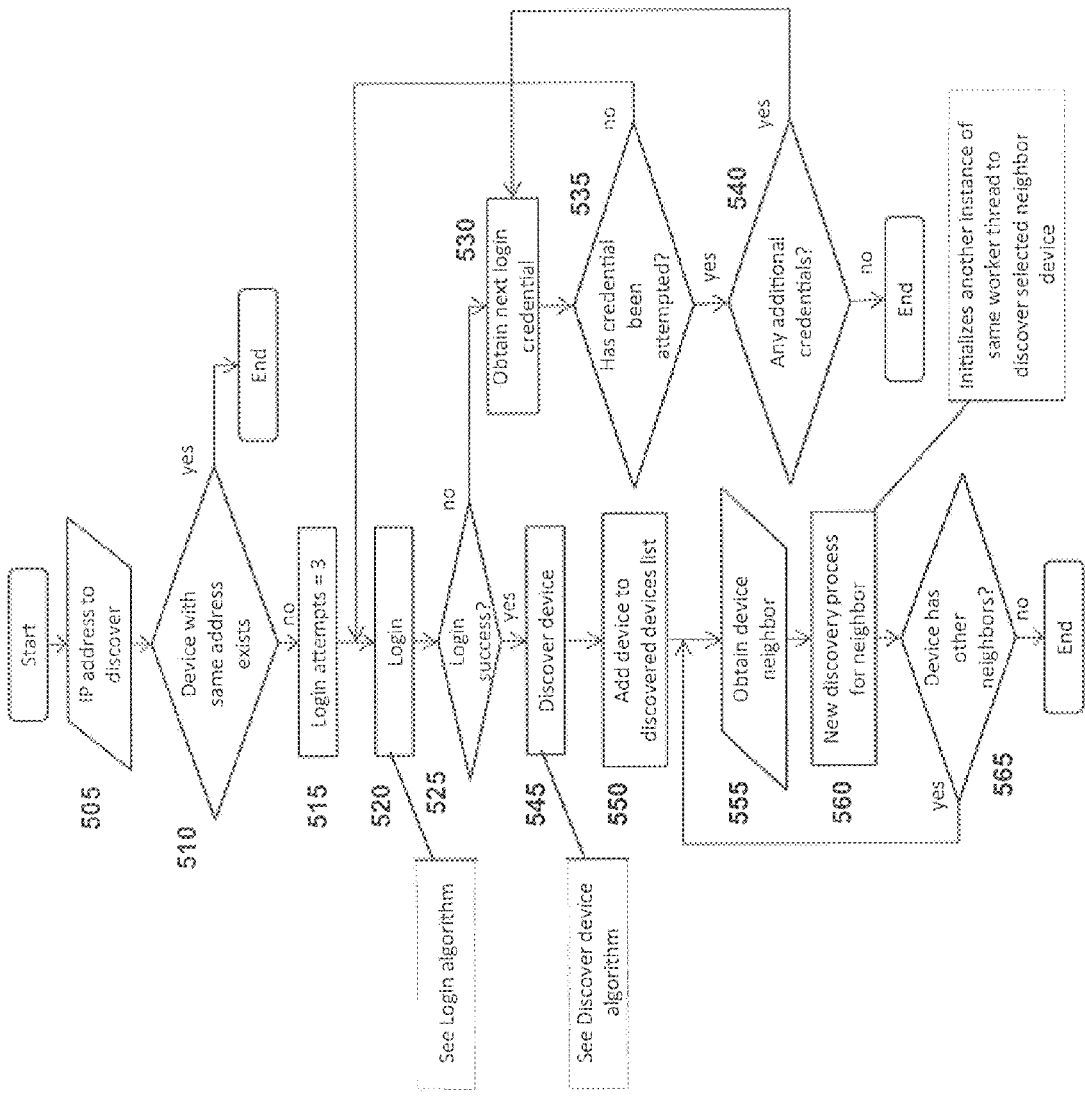
FIG. 5 is a flowchart explaining a process by which discovery threads discover networked devices of the client network according to an exemplary embodiment.

FIG. 5 is a flowchart explaining the discovery threads initialed in step 430 of FIG. 4, according to an exemplary embodiment. Referring to FIG. 5, the monitoring server 110 reads from the discovery wizard an IP address of a device to be discovered in step 505. In step 510, it is determined whether a device with the same IP address as the read IP address exists. If so, the process ends. If a device with the same IP address does not already exist, in step 515 the login attempt variable is set equal to a particular value, for example 3, and the system attempts to login at step 520. The login attempt variable indicates the number of times the system will attempt to reach the login interface for a particular set of login credentials. At step 525, it is determined whether login was successful. If it is determined that login was not successful at step 525, the process obtains the next login credential from a login attempts dictionary at step 530. In step 535, it is determined if the obtained next login credential has been attempted for the device. If the next login credential has not been attempted, the process attempts to login with the next login credential at step 520. If the obtained next login credential has previously been used to attempt to login to the device, the process determines in step 540 whether there are any more login credentials that have not been attempted. If there are no more login credentials to be attempted, the process ends. If it is determined that there are additional login credentials that have not been attempted, a new login credential is obtained in step 530 from the login attempts dictionary. If it is determined that login was successful at step 525, the process discovers a device on the network in step 545, as explained in more detail below. Once a device has been discovered in step 545, the discovered device is added to the discovered devices list in step 550. In step 555, a device neighboring the device discovered in step 555 is identified. At step 560, a new discovery process is initiated for the neighboring device. After the neighboring device has been discovered, it is determined whether the initially discovered device has any other neighboring devices at step 565. If no other neighboring devices are detected, the process ends. If it is determined step 565 that other neighboring devices exist, the process reverts to step 555 where another neighboring device is identified.

Figure 6:
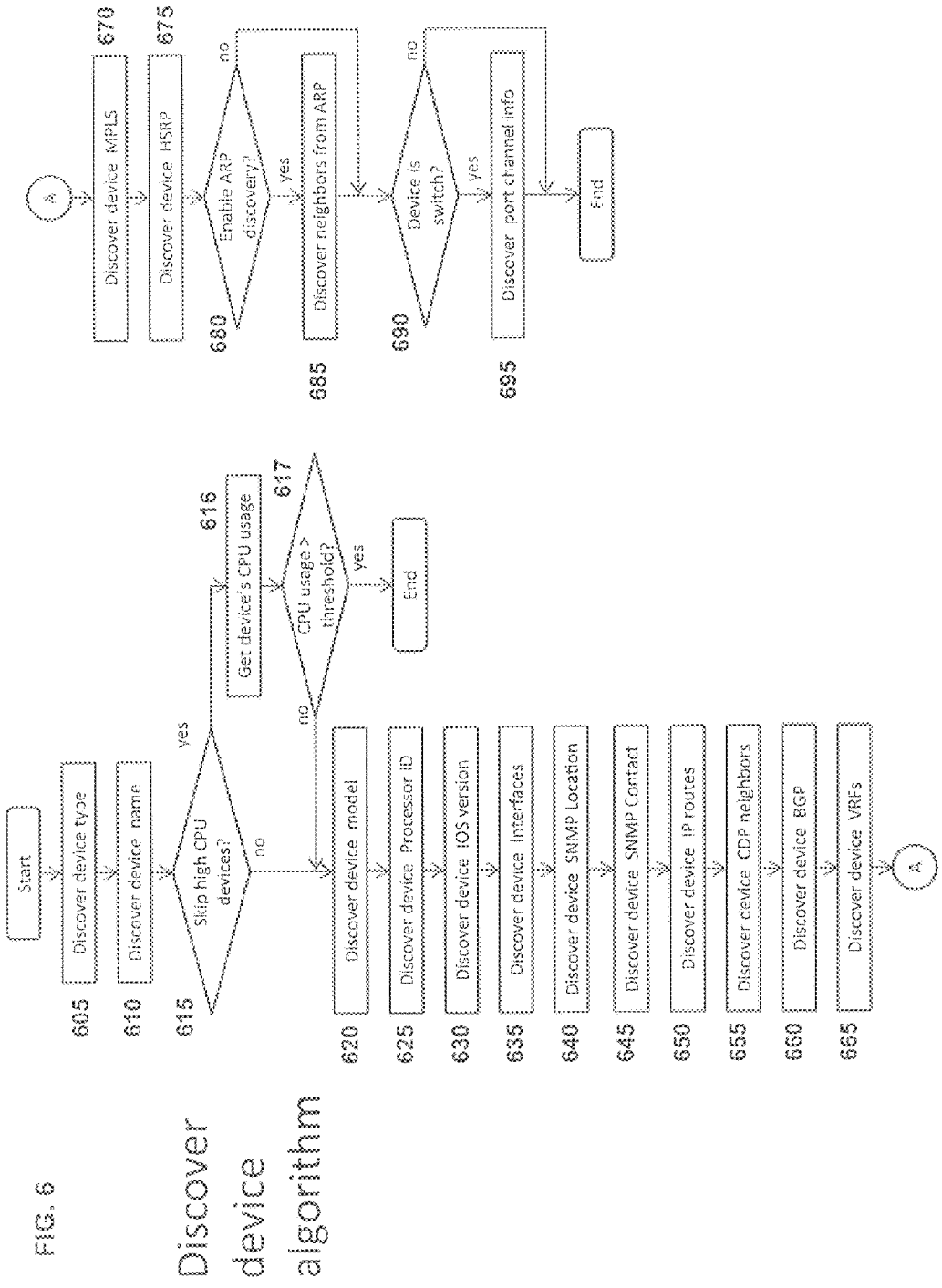
FIG. 6 is a flowchart describing a process by which a device on the network is discovered according to an exemplary embodiment.

FIG. 6 is a flowchart explaining in more detail step 540 in which a device on the network is discovered according to an exemplary embodiment. Referring to FIG. 6, in step 605, the device type of the networked device is discovered. For example, the device type may include, for example, router, switch, server, etc. In step 610, the device name is discovered. At step 615, it is determined whether the user has enabled a setting that skips the discovery of devices having high CPU usage. If the user has enabled this setting, the device's CPU usage is determined at step 616. In step 617 it is determined whether the determined CPU usage is above a CPU usage threshold. If the determined CPU usage is above the CPU usage threshold, the discovery process for that device ends. Thus, by enabling this setting and selecting the CPU usage threshold, the user is able to avoid discovering devices with high CPU usage, in order to avoid creating problems within the network due to the extra CPU resources required for discovery. If it is determined in step 617 that the CPU usage does not exceed the CPU usage threshold, or if it is determined at step 615 that the user has not enabled the setting that skips the discovery of devices having high CPU usage, the process proceeds to step 620, where the model of the device is discovered.

The process continues at step 625, in which the processor ID of the device is discovered. In step 630, the version of the device's operating system is discovered. At step 635, the device interfaces are discovered, and at step 640 the device SNMP location is discovered. In step 645, the device SNMP contact is discovered, and the device IP routes are discovered in step 650. The device's CDP neighbors are discovered in step 655, the device's BGP (Border Gateway Protocol) is discovered in step 660, the device's VRFs [Virtual Routing Field] are discovered in step 665, the device's MPLS (Multi-Protocol Label Switching) is discovered in step 670, and the device's HSRP (Hot Standby Routing Protocol) is discovered in step 675. In this step, VRRP (Virtual Router Redundancy Protocol) and GLBP (Gateway Load Balancing Protocol) may also be discovered. In step 680, it is determined whether ARP (Address Resolution Protocol) discovery is enabled. If ARP discovery is enabled, the process discovers neighbors from ARP in step 685, and then determines if the device is a switch in step 690. If ARP discovery is not enabled, the process skips discovering neighbors from ARP in step 685 and verifies whether the device is a switch in step 690. If it is determined in step 690 that the device is not a switch, the process ends. If it is determined in step 690 that the device is a switch, port channel information is discovered in step 695. After the port channel information is discovered in step 695, the process ends.

Figure 7:
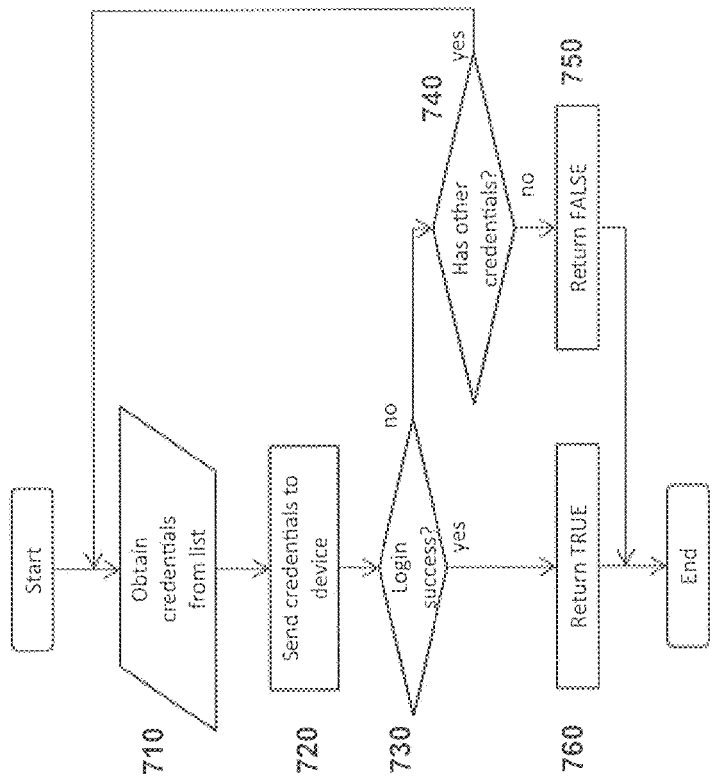
FIG. 7 is a flowchart describing a login process according to an exemplary embodiment.

FIG. 7 is a flowchart explaining in more detail the login process referenced at step 520 in FIG. 5 according to an exemplary embodiment. According to an exemplary embodiment, the login algorithm may use multiple credentials specified by the user in discovery parameters. In the case of a successful login, matching credentials are stored for future querying of the device.

Referring to FIG. 7, the login process begins at step 710, in which login credentials are obtained from the login attempts library. The obtained credentials are sent to the discovered device in step 720. In step 730, it is determined whether the login was successful. If it is determined at step 730 that the login was not successful, the process determines whether other credentials may be used in step 740. If it is determined in step 740 that other credentials may be used, the process returns to step 710. If it is determined at step 740 that there are no other credentials to be used, the process returns a "False" result in step 750, and the login process ends. If in step 730 it is determined that the login process was successful, the process returns a "True" result in step 760 and the login process ends.

Figure 8:
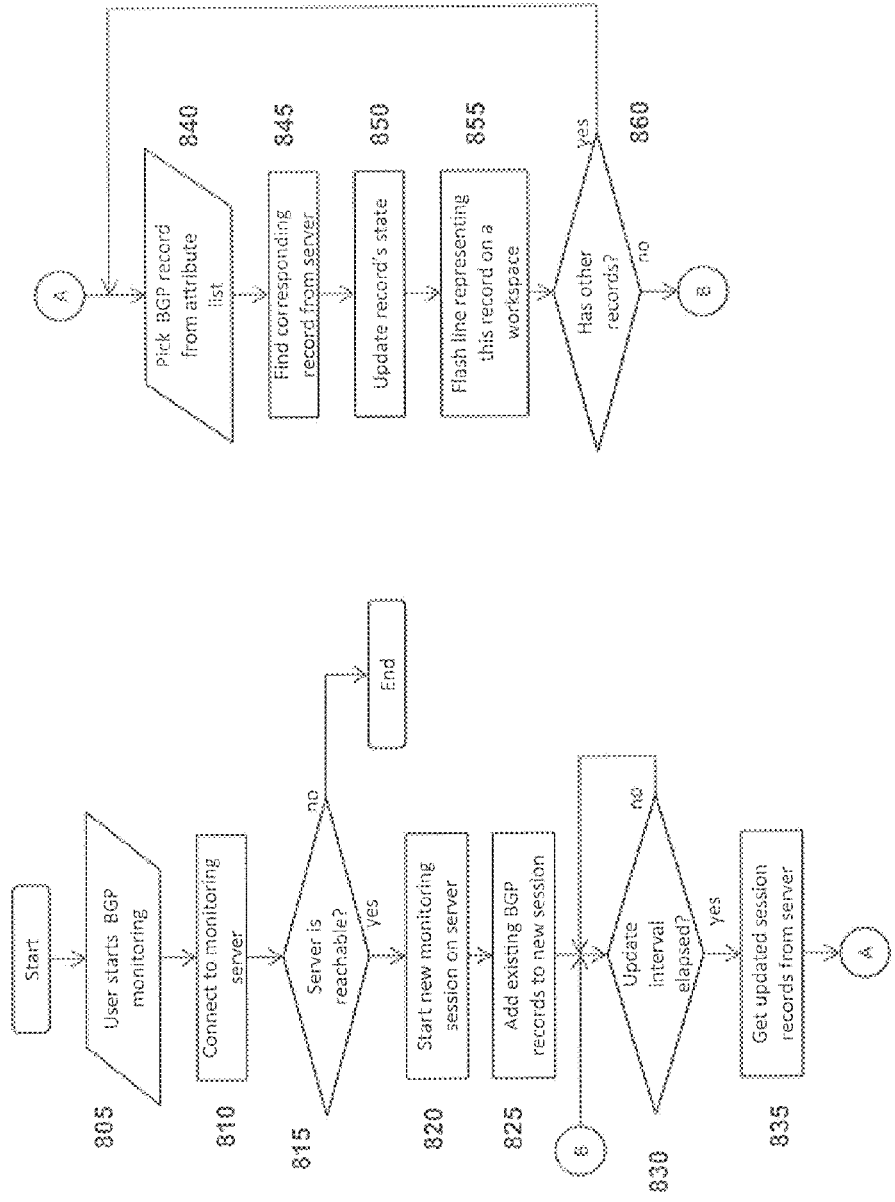
FIG. 8 is a flowchart describing a process of monitoring states of discovered BGP neighbors according to an exemplary embodiment.

In addition to discovering network devices, the discovery/monitoring server 110 may also monitor the devices discovered in client network 100. The client application 150 is capable of directing the monitoring server 110 to perform various types of monitoring. For example, FIG. 8 is a flowchart describing a process of monitoring states of discovered BGP neighbors according to an exemplary embodiment. In the exemplary embodiment, the monitoring server 110 performs querying of the discovered device, and the results may be transmitted to the client application 150 at predetermined times, time intervals, or any other time. When the state of a BGP neighbor is updated, a line or other object in the workspace 140 representing the updated BGP neighbor flashes, or provides some other indication of the update.

Referring to FIG. 8, the user of the client application 150 starts BGP monitoring at step 805. In step 810, the client application 150 connects to the monitoring server 110. In step 815, it is determined whether the monitoring server 110 is reachable. If it is determined that the monitoring server 110 is not reachable, the BGP monitoring process ends. If it is determined at step 815 that the monitoring server 110 is reachable, a new monitoring session is started on the monitoring server 110 at step 820. In step 825, existing BGP records are added to the new session. At step 830, it is determined whether an update interval has elapsed. If the update interval has elapsed, the process proceeds to step 835, where the client application 150 obtains updated session records from the monitoring server 110. If it is determined at step 830 that the update interval has not elapsed, the process continues checking the update interval until it has elapsed. At step 840, a BGP record is selected from the attribute list of the workspace 140 for client network 100. In step 845, a corresponding record is located by the monitoring server 110. The BGP record selected from the attribute list is then updated in in step 850 using the corresponding record located in the monitoring server 110. At step 855, an indication representing the updated record is flashed on the workspace 140. The indication may be any type of visual or other type of indicator. In step 860, it is determined whether the attribute list includes any other BGP records. If it is determined that the attribute list does not include any other BGP records, the BGP monitoring process ends. If it is determined at step 860 that the attribute list includes other BGP records, the process returns to step 830, where it is determined if the update interval has elapsed.

Figure 9:
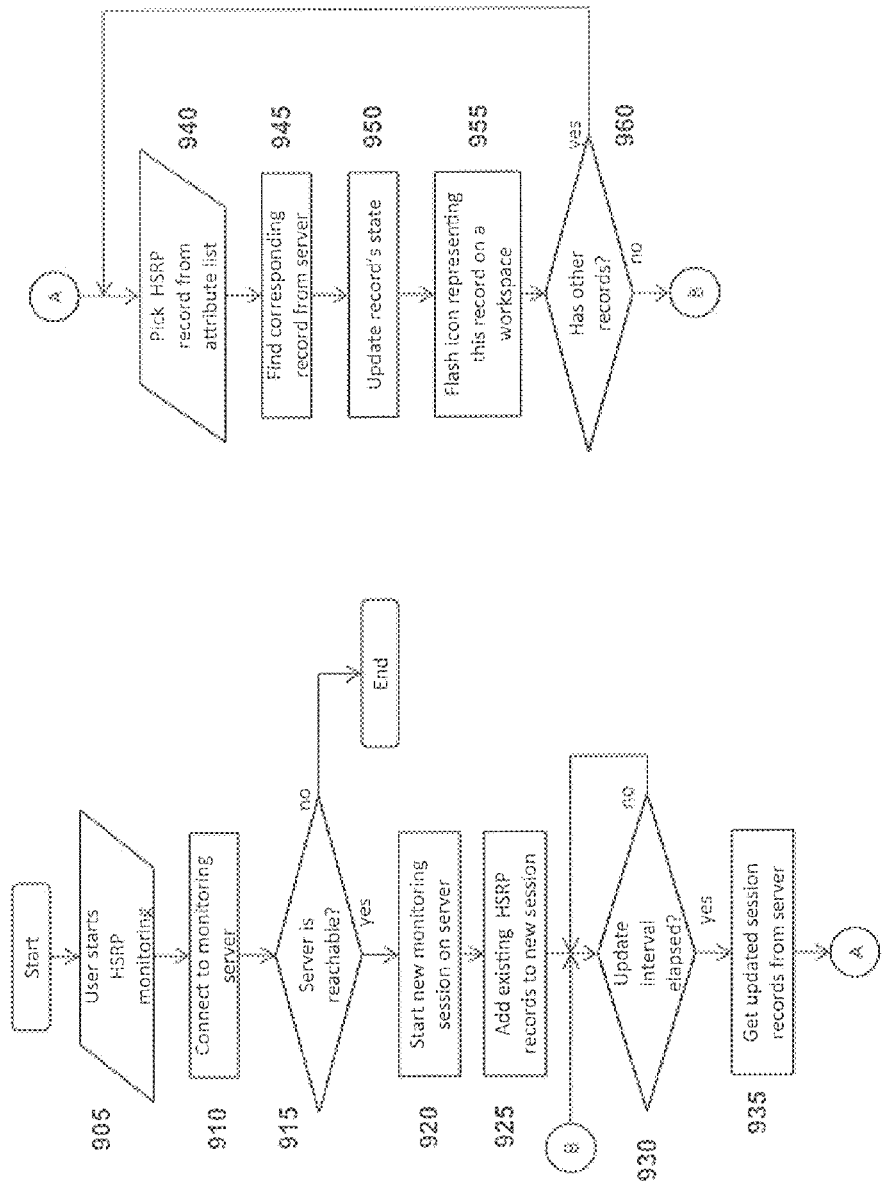
FIG. 9 is a flowchart describing a process of monitoring states of discovered virtual IP addresses according to an exemplary embodiment.

FIG. 9 is a flowchart illustrating another type of monitoring, HSRP monitoring, according to an exemplary embodiment. In the exemplary embodiment, the states of discovered virtual IP addresses (VIPs) are monitored. The monitoring server 110 performs querying of the discovered device, and the results may be transmitted to the client application 150 at predetermined times, time intervals, or any other time. When the state of a VIP is updated, an icon in the workspace 140 that represents the updated VIP flashes, or provides some other indication of the update.

Referring to FIG. 9, the user of the client application 150 starts the HSRP monitoring process at step 905. At step 910, the client application 150 connects to the monitoring server 110. At step 915, it is determined whether the monitoring server 110 is reachable. If the monitoring server 110 is not reachable, the HSRP monitoring process ends. If it is determined at step 915 that the monitoring server 110 is reachable, a new HSRP monitoring session is started at step 920 on the monitoring server 110. In step 925, exiting HSRP records are added to the new session. At step 930, it is determined whether an update interval has elapsed. If it is determined that the update interval has not elapsed, the process continues checking the update interval until it has elapsed. If it is determined at step 930 that the update interval has elapsed, the process proceeds to step 935, where the client application 150 obtains updated session records from the monitoring server 110. At step 940, an HSRP record is selected from the attribute list of the workspace 140 for client network 100. In step 945, a corresponding record is located by the monitoring server 110. The HSRP record selected from the attribute list is then updated in in step 950 using the corresponding record located in the monitoring server 110. At step 955, an indication representing the updated record is flashed on the workspace 140. The indication may be any type of visual or other type of indicator. In step 960, it is determined whether the attribute list includes any other HSRP records. If it is determined that the attribute list does not include any other HSRP records, the HSRP monitoring process ends. If it is determined at step 960 that the attribute list includes other HSRP records, the process returns to step 930, where it is determined if the update interval has elapsed.

Figure 10:
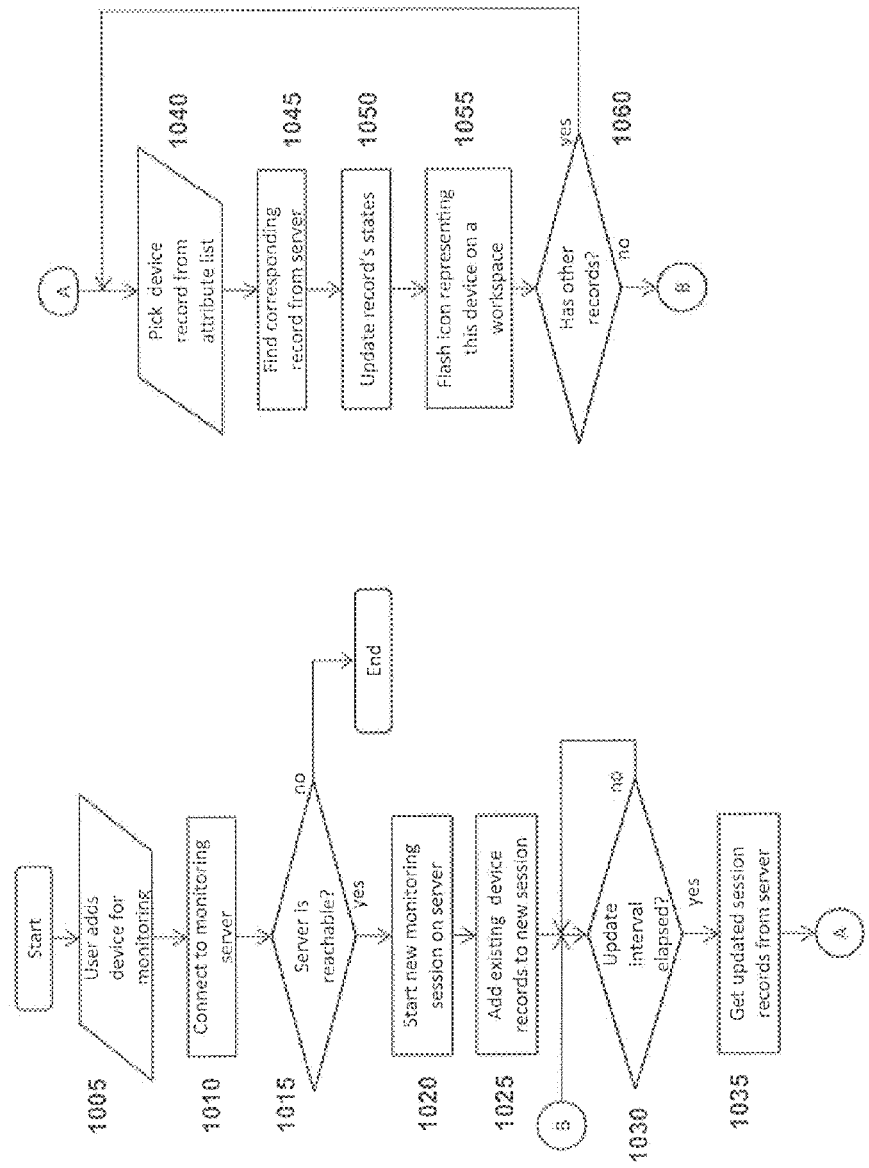
FIG. 10 is a flowchart illustrating a process of monitoring states of discovered devices according to an exemplary embodiment.

FIG. 10 is a flowchart illustrating a process of monitoring states of the discovered devices according to an exemplary embodiment. In the exemplary embodiment, the process may monitor, without limitation, one or more of interface loads, route count, memory used, available memory, CPU usage, uptime, and TCAM count. The monitoring server 110 performs querying of the discovered device, and the results may be transmitted to the client application 150 at predetermined times, time intervals, or any other time. When the state of a discovered device is updated, an icon in the workspace 140 that represents the updated device flashes, or provides some other indication of the update.

Referring to FIG. 10, the user of the client application 150 starts the device monitoring process at step 1005. At step 1010, the client application 150 connects to the monitoring server 110. At step 1015, it is determined whether the monitoring server 110 is reachable. If the monitoring server 110 is not reachable, the device monitoring process ends. If it is determined at step 1015 that the monitoring server 110 is reachable, a new device monitoring session is started at step 1020 on the monitoring server 110. In step 1025, existing device records are added to the new session. At seep 1030, it is determined whether an update interval has elapsed. If it is determined that the update interval has not elapsed, the process continues checking the update interval until it has elapsed. If it is determined at step 1030 that the update interval has elapsed, the process proceeds to step 1035, where the client application 150 obtains updated session records from the monitoring server 110. At step 1040, a device record is selected from the attribute list of the workspace 140 for client network 100. In step 1045, a corresponding record is located by the monitoring server 110. The device record selected from the attribute list is then updated in in step 1050 using the corresponding record located in the monitoring server 110. At step 1055, an indication representing the updated record is flashed on the workspace 140. The indication may be any type of visual or other type of indicator. In step 1060, it is determined whether the attribute list includes any other device records. If it is determined that the attribute list does not include any other device records, the device monitoring process ends. If it is determined at step 960 that the attribute list includes other device records, the process returns to step 1030, where it is determined if the update interval has elapsed.

Figure 11:
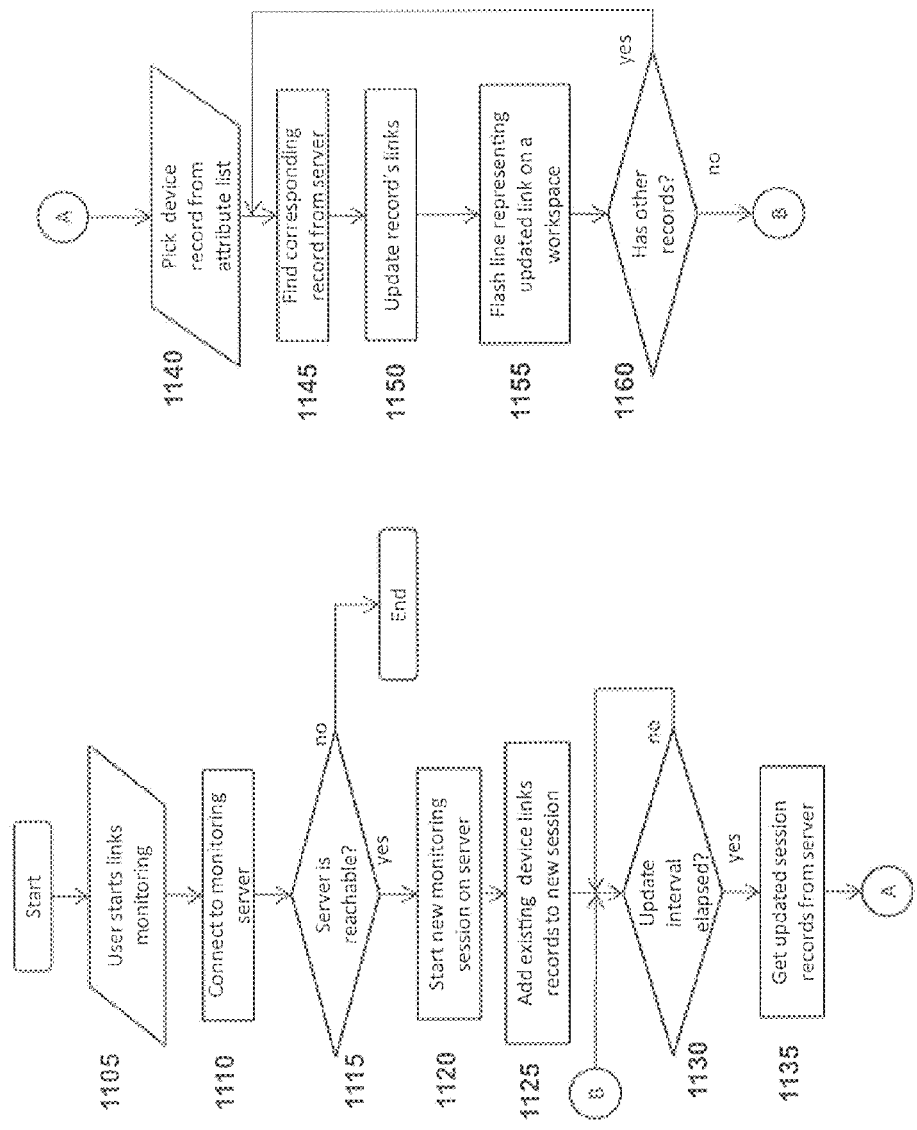
FIG. 11 is a flowchart illustrating a process of monitoring interfaces of the discovered devices, or links between discovered devices, according to an exemplary embodiment.

FIG. 11 is a flowchart illustrating a process of monitoring interfaces of the discovered devices, or links between discovered devices, according to an exemplary embodiment. In the exemplary embodiment, the process may monitor links between discovered devices to detect changes in the network topology. The monitoring server 110 performs querying of the discovered device, and the results may be transmitted to the client application 150 at predetermined times, time intervals, or any other time.

Referring to FIG. 11, the user of the client application 150 starts the link monitoring process at step 1105. At step 1110, the client application 150 connects to the monitoring server 110. At step 1115, it is determined whether the monitoring server 110 is reachable. If the monitoring server 110 is not reachable, the link monitoring process ends. If it is determined at step 1115 that the monitoring server 110 is reachable, a new link monitoring session is started at step 1120 on the monitoring server 110. In step 1125, existing device link records are added to the new session. At step 1130, it is determined whether an update interval has elapsed. If it is determined that the update interval has not elapsed, the process continues checking the update interval until it has elapsed. If it is determined at step 1130 that the update interval has elapsed, the process proceeds to step 1135, where the client application 150 obtains updated session records from the monitoring server 110. At step 1140, a device record is selected from the attribute list of the workspace 140 for client network 100. In step 1145, a corresponding record is located by the monitoring server 110. The links in the device record selected from the attribute list are then updated in in step 1150 using the corresponding record located in the monitoring server 110. At step 1155, a line representing an updated link on a workspace is flashed or otherwise indicates that the link has been updated. In step 1160, it is determined whether the attribute list includes any other device records. If it is determined that the attribute list does not include any other device records, the link monitoring process ends. If it is determined at step 1160 that the attribute list includes other device records, the process returns to step 1130, where it is determined if the update interval has elapsed.

Figure 12:
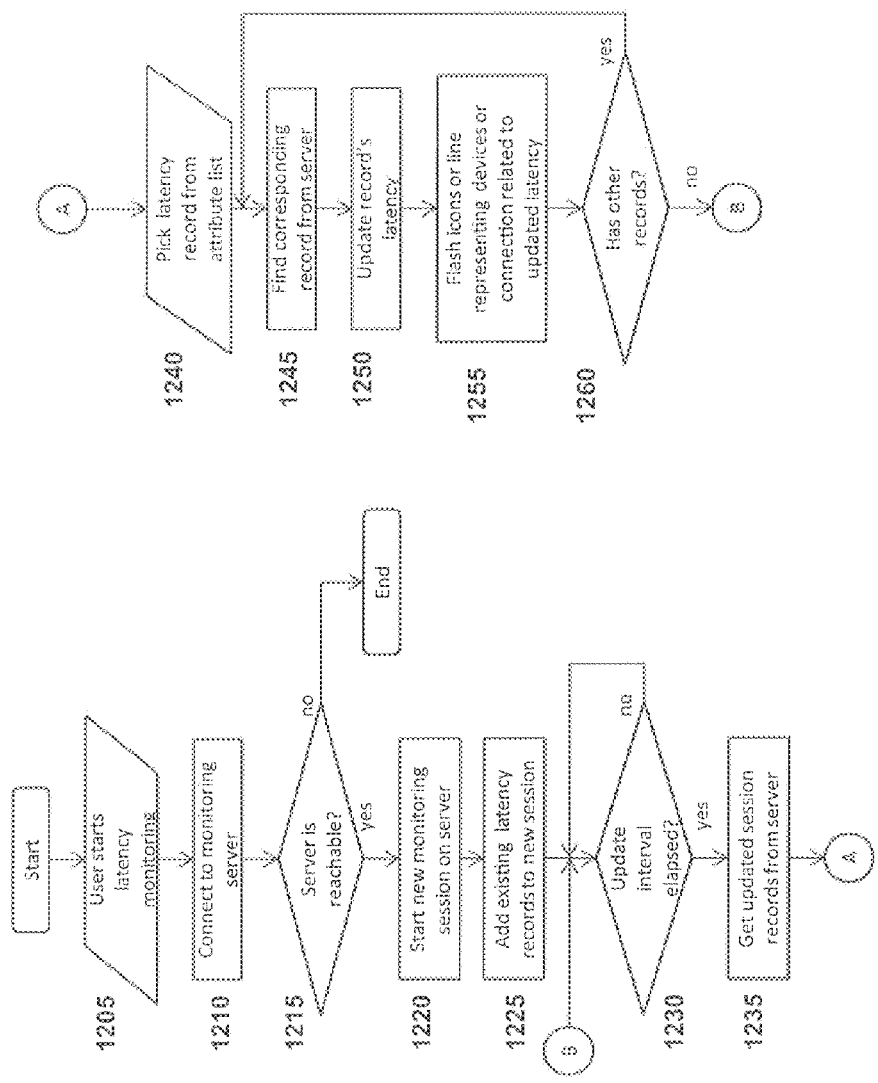
FIG. 12 is a flowchart illustrating a process of latency monitoring, according to an exemplary embodiment.

FIG. 12 is a flowchart illustrating a process of latency monitoring, according to an exemplary embodiment. In the exemplary embodiment, the process may monitor latencies between may pair of discovered devices. The monitoring server 110 performs querying of the discovered devices, and the results may be transmitted to the client application 150 at predetermined times, time intervals, or any other time. When the latency between any pair of discovered devices is updated, one or more icons in the workspace 140 that represent the latency and/or the discovered devices flashes, or provide some other indication of the update.

Referring to FIG. 12, the user of the client application 150 starts the latency monitoring process at step 1205. At step 1210, the client application 150 connects to the monitoring server 110. At step 1215, it is determined whether the monitoring server 110 is reachable. If the monitoring server 110 is not reachable, the latency monitoring process ends. If it is determined at step 1215 that the monitoring server 110 is reachable, a new latency monitoring session is started at step 1220 on the monitoring server 110. In step 1225, existing latency records are added to the new session. At step 1230, it is determined whether an update interval has elapsed. If it is determined that the update interval has not elapsed, the process continues checking the update interval until it has elapsed. If it is determined at step 1230 that the update interval has elapsed, the process proceeds to step 1235, where the client application 150 obtains updated session records from the monitoring server 110. At step 1240, a latency record is selected from the attribute list of the workspace 140 for client network 100. In step 1245, a corresponding record is located by the monitoring server 110. The latency in the device record selected from the attribute list is then updated in in step 1250 using the corresponding record located in the monitoring server 110. At step 1255, an indication representing the updated latency record is flashed on the workspace 140. The indication may be any type of visual or other type of indicator. At step 1260, it is determined whether the attribute list includes any other latency records. If it is determined that the attribute list does not include any other latency records, the latency monitoring process ends. If it is determined at step 1260 that the attribute list includes other latency records, the process returns to step 1230, where it is determined if the update interval has elapsed.

As the devices in the client network 100 are detected and/or monitored, the DX renderer 142 performs a rendering algorithm to visualize the client network 100 and its discovered devices in workspace 140. By rendering the visualization of the client network 100 as the results of the discovery and/or monitoring process are obtained, the user is able to graphically view changes to the network and/or the networked devices in real-time.

Figure 13:
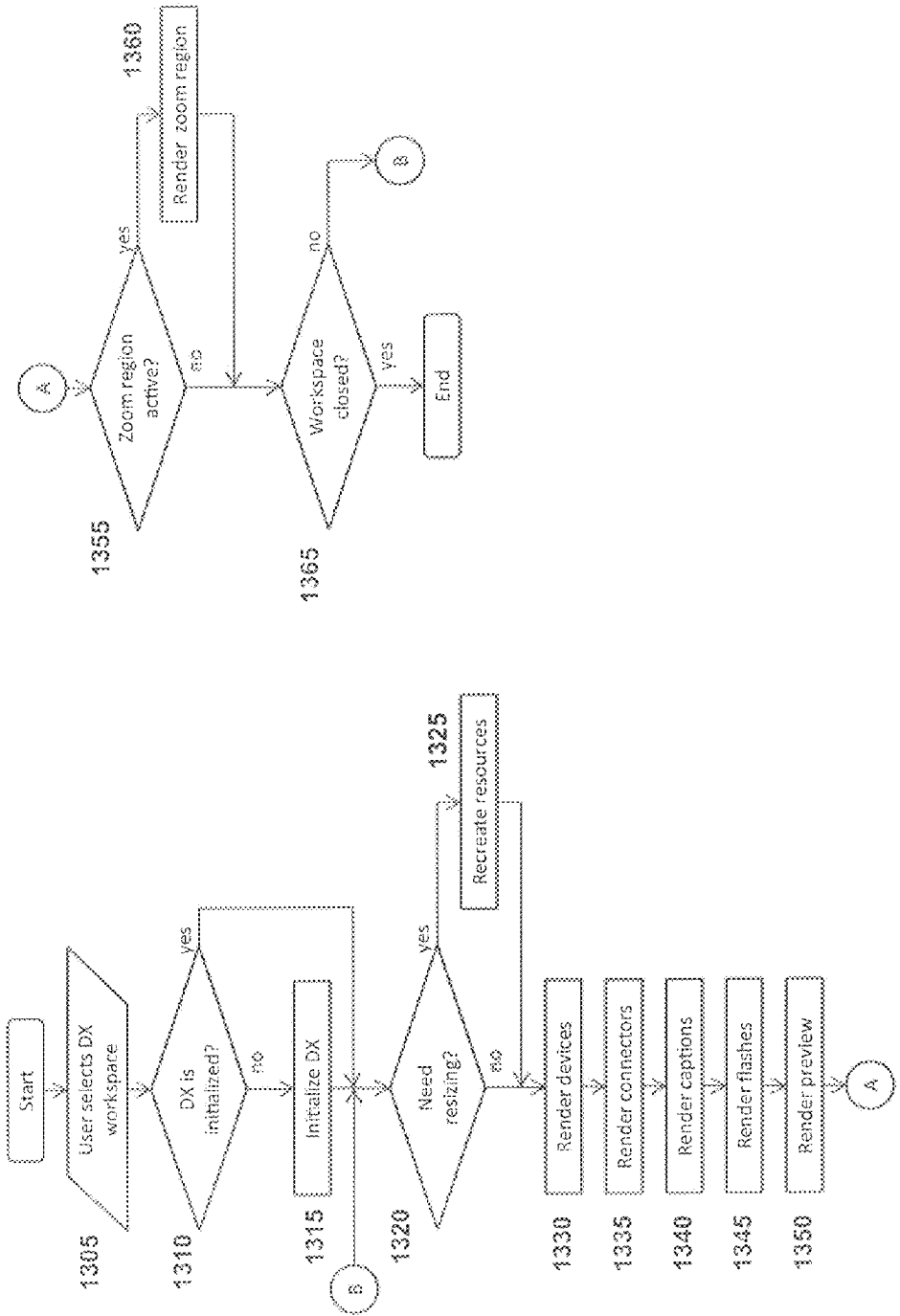
FIG. 13 is a flowchart illustrating a rendering algorithm executed by the DX renderer according to an exemplary embodiment.

FIG. 13 is a flowchart illustrating a rendering algorithm executed by the DX renderer 142 according to an exemplary embodiment. Referring to FIG. 13, the rendering algorithm of the exemplary embodiment begins at step 1305 with the selection of a DX workspace. Once a DA workspace has been selected, it is determined in step 1310 whether the DX workspace is initialized. If it is determined in step 1310 that the DX workspace is not initialized, the selected DX workspace is initialized in step 1315, and the process proceeds to step 1320. If it is determined in step 1310 that the selected DX workspace is initialized, the process proceeds to step 1320. In step 1320, it is determined whether the DX workspace requires resizing. If it is determined that the selected DX workspace needs resizing, the process recreates the necessary resources and adjusts the size of the workspace in step 1325, and the process continues to step 1330. If it is determined in step 1320 that the selected DX workspace does not require resizing, the process proceeds to step 1330.

In step 1330, the DX renderer renders the detected devices. In step 1335, the DX renderer renders the connectors between the detected devices. In step 1340, the DX renderer renders captions for the rendered detected devices and connectors. In step 1345, the DX renderer renders flashes or other indications representing that the network, the detected devices, or some aspect of the network or detected devices, e.g., latency, has been updated. In step 1355, it is determined whether a zoom region of the workspace 140 is active. If it is determined that the zoom region is active, the DX renderer renders the zoom region at step 1360, and the process continues to step 1365. If it is determined in step 1355 that the zoom region is not active, the process continued to step 1365. At step 1365, it is determined whether the workspace 140 is closed. If it is determined that the workspace 140 is closed, the rendering process ends. If it is determined in step 1365 that the workspace 140 has not been closed, the process reverts to step 1320, where it is determined whether the workspace inquires resizing.

According to an exemplary embodiment, client application 150 allows the user to select from numerous workspaces 100, so that the user is able to visualize many different client networks 100. According to an exemplary embodiment, the DX renderer may utilize Direct X to perform rendering. By using Direct X, the rendering operation is offloaded from the system's CPU to a graphical processing unit (GPU) located on the graphics card. This implementation allows for visualization of much larger and more complex networks, and attributes of the networks and the discovered devices, by not requiring resources of the CPU.

The rendering function according to an exemplary embodiment may include 2-dimensional (2D) and/or three-dimensional (3D) visualization of the client network 100, the discovered devices, the connections between discovered devices, and various attributes of the client network 110, discovered devices, and connections. For example, the rendering according to an exemplary embodiment may include 3D latency calculation.

For example, FIG. 14 is a main window layout diagram of a rendered workspace 140 according to an exemplary embodiment. Referring to FIG. 14, a ribbon 1405 may be located at the top of the layout. The ribbon 1405 may include various menus containing functions the user may select. The menus may include, without limitation, "workspace," "edit," "search," "view," "tools," "settings," "design," "help desk," "links," "drawing," and "help." Under the ribbon 1405, the layout may include a workspace grid 1410 that includes an icon for each workspace the client application 150 is rendering. The user is able to view different workspaces by selecting the appropriate icon corresponding to the desired workspace.

The layout may also include an attribute window 1415, which contains various attributes of the selected workspace. These attributes may include, without limitation, design mode, common inventory, discovery mode, device monitoring, connection information, BGP links, latency map, high availability monitor, HSRP, tracking center, and configuration management. In the exemplary monitoring algorithms described in FIGS. 8-12, the various records that are selected from the attribute list may be selected from the corresponding attribute list shown in the attribute window 1415.

The layout of the exemplary embodiment may also include global control window 1420, which includes a graphical representation of the discovered devices in relation to a 3D representation of the Earth. The user may manipulate the 3D representation to view the discovered devices at any place on Earth. The exemplary layout may also include picture-in-picture (PIP) window 1425 that includes thumbnail images of various representations of the client network. For example, the thumbnail images may include, without limitation, a global view of the client network, a map view of the client network, and a stencil view of the client network.

The exemplary layout may also include a search window 1435 that allows a user to search for discovered devices in the client network, and a status bar 1440 that indicates the active applications, Internet connection, etc. The exemplary layout may also include a legend window 1445 that provides a description of the various elements of the visualized workspace. For example, the visualized workspace may include various types of connections between discovered devices (e.g., Fast Ethernet, Layer 2, VLAN, Ethernet, etc.) and denote these connections with different colors, broken, dotted or solid lines, etc. The legend window 1445 indicates how the various devices and connections are depicted in the workspace.

The exemplary layout may also include a device tree window 1450 and a drawing stencil window 1455. The device tree window 1450 may include a structured list of devices in the client network. The drawing stencil window 1455 may include a 2D tendering of the discovered devices without using DirectX. The exemplary layout may also include a selected workspace area 1460 that displays a visualization of the selected workspace. The visualization may include various objects that represent discovered devices in the client network. Each type of discovered device (e.g., server, router, client, etc.) may be represented with a designated shape or type of object (e.g., cube, cylinder, etc.). The visualization may also include various links or connections between the discovered devices. For example, the visualization may display various types of physical and/or logical connections between the discovered devices, which may be distinguished by different line types (e.g., solid, dashed, dotted, etc.) and colors. The selected workspace area 1460 may also include a filter menu that allows a user to select certain types of connections and discovered devices that are displayed. The selected workspace area also may allow the user to drag objects to different locations within the selected workspace area, with the displayed connections between the detected devices being modified as the object is moved. The visualization shown in the selected workspace area 1460 may be a 3D or 2D representation. If the visualization is 3D, the user may rotate the visualization to obtain different views of the selected workspace.

Figure 14A:
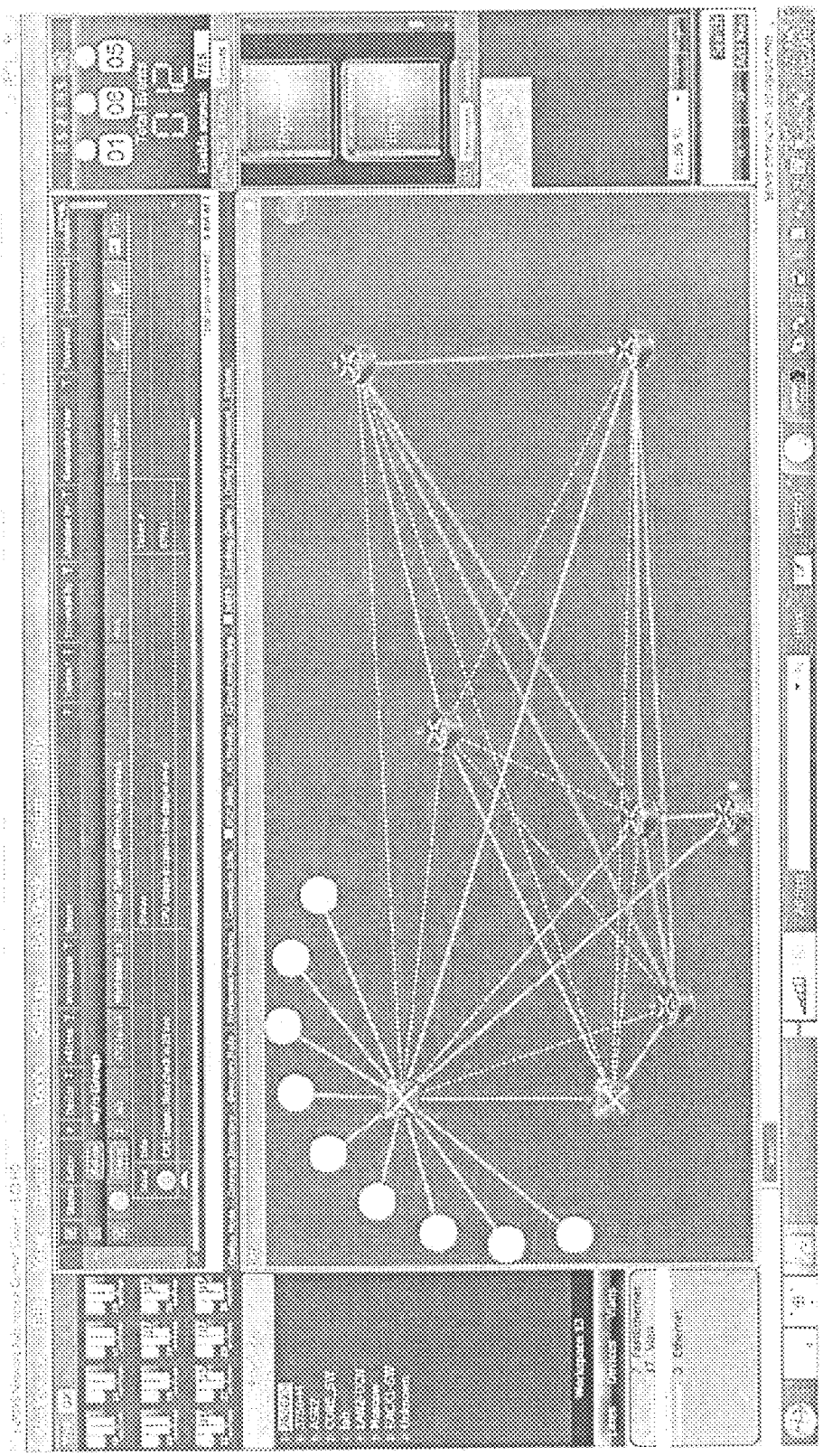
FIGS. 14 and 14 A through 14I illustrate a main window layout of a rendered workspace according to several exemplary embodiments.

FIG. 14A shows an exemplary view of the main window layout according to an exemplary embodiment. The main window layout of FIG. 14A includes the various windows described above in connection with FIG. 14, including a selected workspace area that may render the selected workspace using DirectX.

Figure 14B:
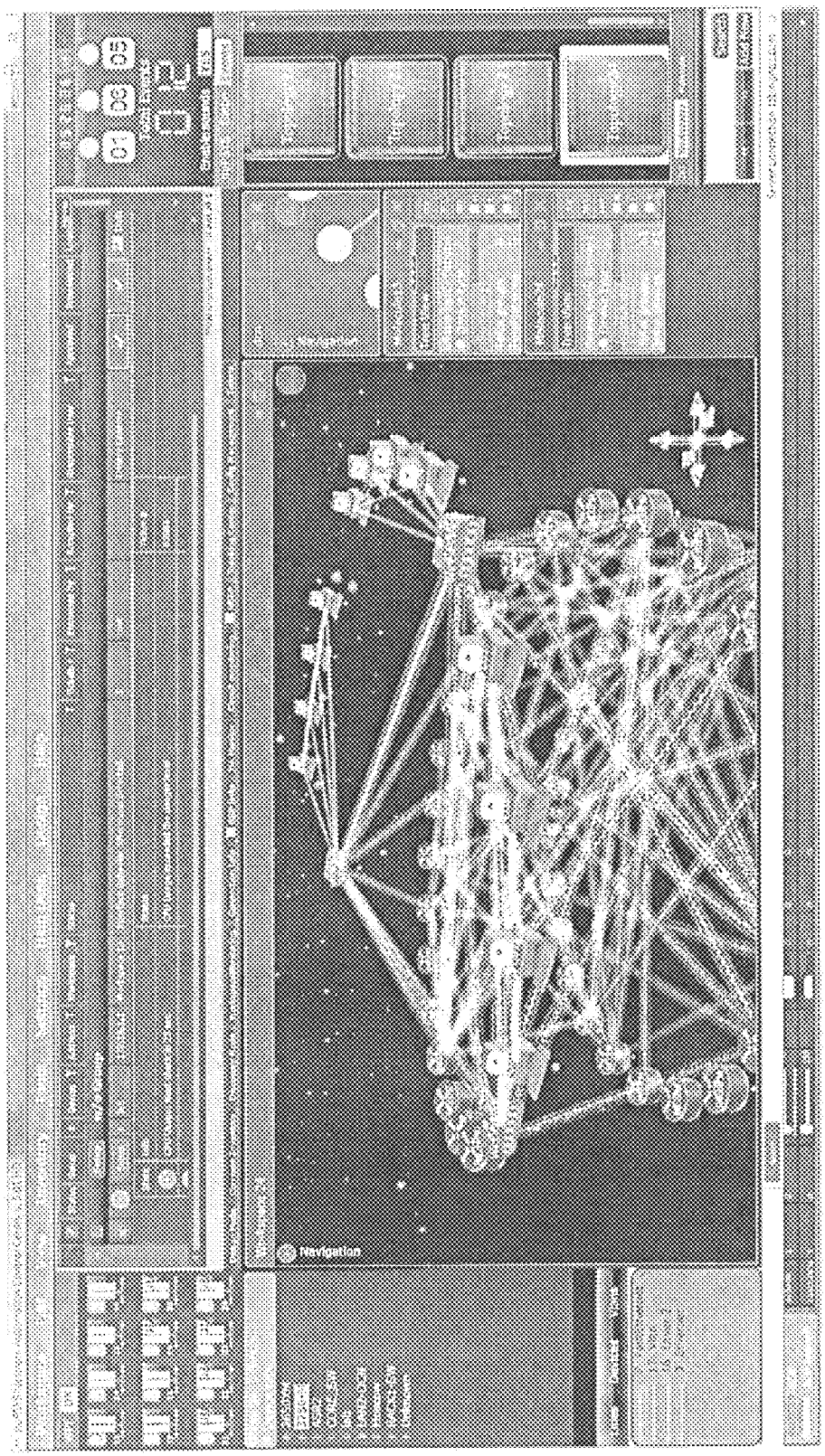

FIG. 14B shows an exemplary view of the main window layout according to another exemplary embodiment. In the exemplary embodiment of FIG. 14B, selected workspace 1460 shows a three-dimensional (3D) view of the selected workspace.

Figure 14C:
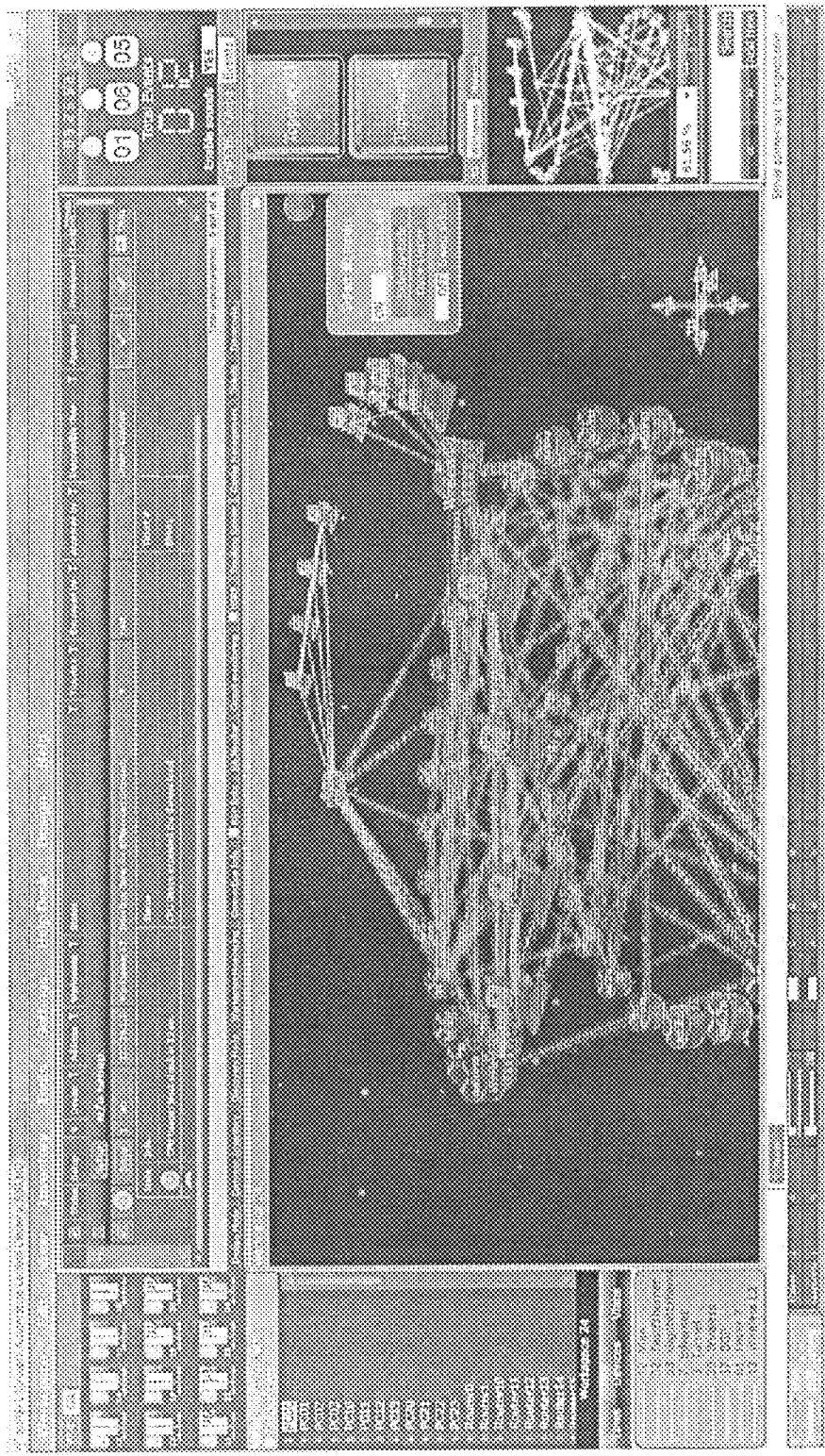

FIG. 14C shows an exemplary view of the main window layout according to another exemplary embodiment. In the exemplary embodiment of FIG. 14C, the selected workspace 1460 shows an alternative view of the selected workspace which, when viewed with 3D glasses or on a 3D TV or screen, appears three-dimensional.

Figure 14D:
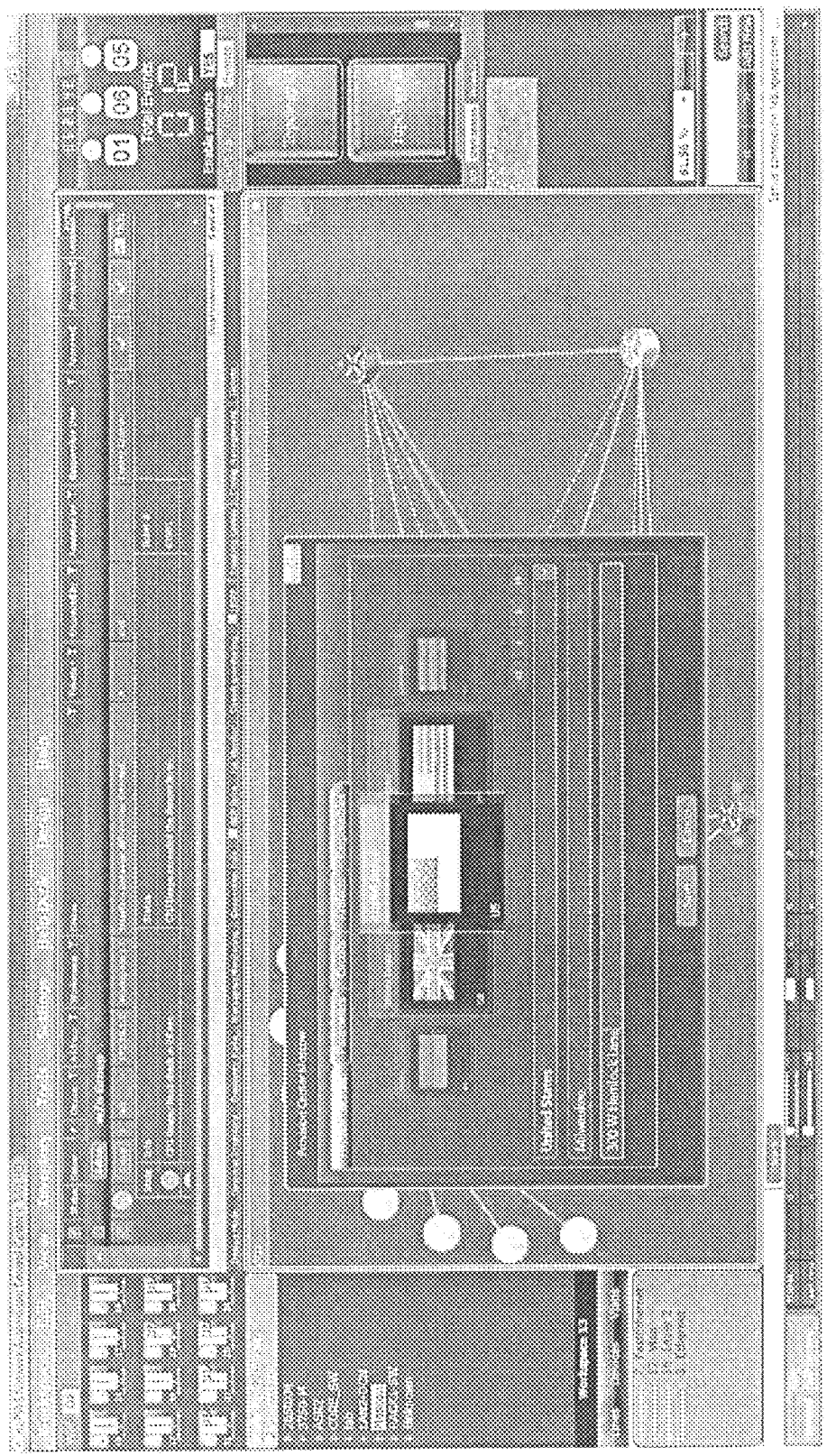

FIG. 14D shows an exemplary view of the main window layout according to an exemplary embodiment. In the exemplary embodiment of FIG. 14D, when a user selects a device within a workspace, a window may appear providing various information about the selected device, which may be grouped by tabs within the window. FIG. 14D illustrates a "physical location" tab of the window that provides information about the physical location of the selected device.

Figure 14E:
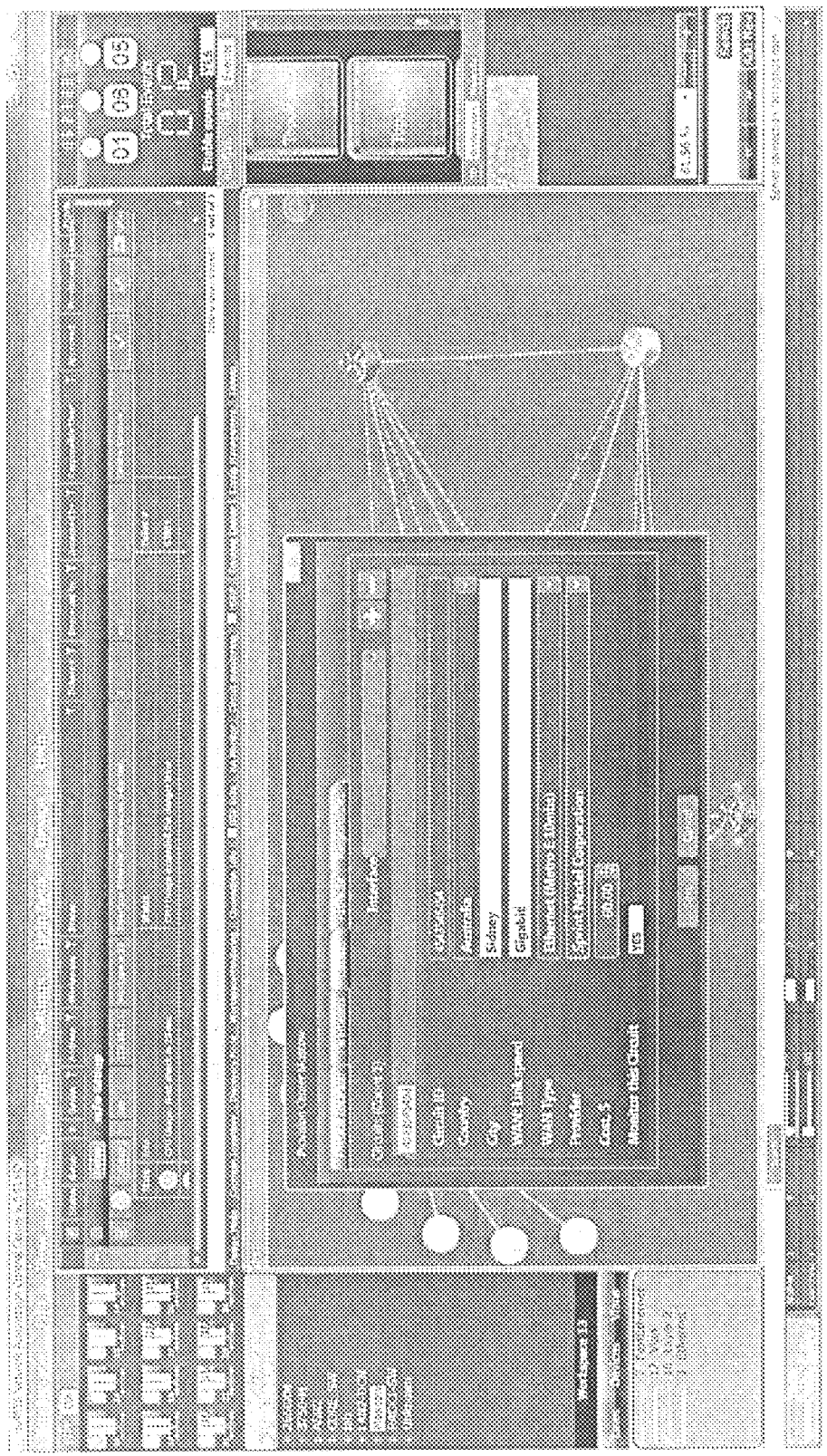

FIG. 14E shows an exemplary view of the main window layout according to an exemplary embodiment. The exemplary embodiment of FIG. 14E illustrates a "Circuits" tab of a window displayed in response to the user's selection of a device within the workspace. The "Circuits" tab may provide technical information about the selected device, such as, without limitation, the connections between the selected device and other devices, a circuit ID that is assigned by the service provider, the identity of the service provider, the network type, and network speed. One skilled in the art would understand that the "Circuits" tab may include additional information regarding the selected device.

Figure 14F:
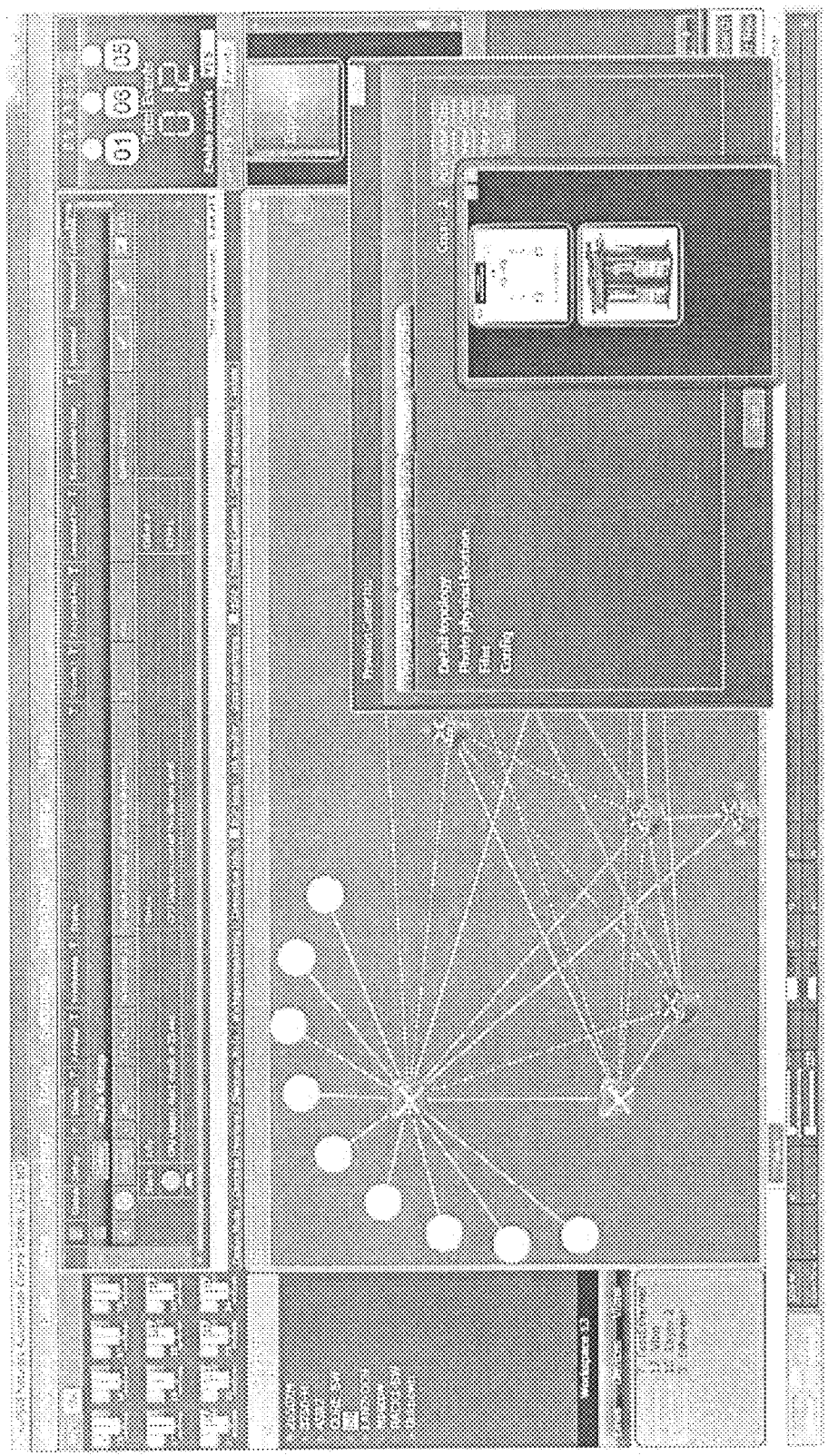

FIG. 14F shows an exemplary view of the main window layout according to an exemplary embodiment. The exemplary embodiment of FIG. 14F illustrates an "Artifacts" tab of a window displayed in response to the user's selection of a device within the workspace. The "Artifacts" tab may allow the user to access technical documentation associated with the selected device. For example, the "Artifacts" tab may include documents in Microsoft Word, Microsoft Power-Point, or PDF format that describe the configuration of the selected device. The "Artifacts" tab may also allow the user to access photographs of the selected device and/or the location of the selected device. One skilled in the art would understand that the "Artifacts" tab may include additional information regarding the selected device.

Figure 14G:
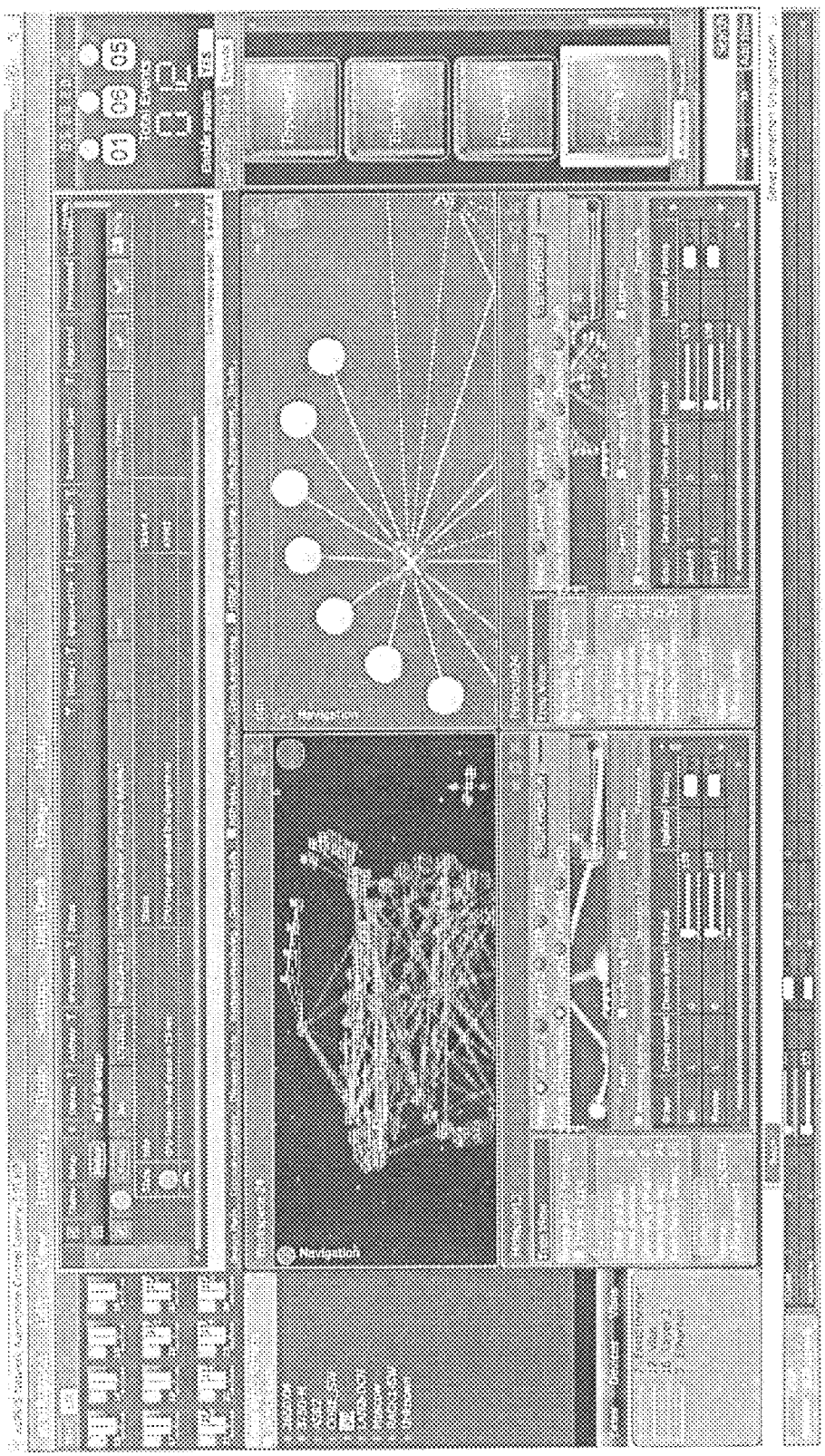

FIG. 14G shows an exemplary view of the main window layout according to an exemplary embodiment. The exemplary embodiment of FIG. 14G is similar to the exemplary embodiment of FIG. 14A, but shows two workspaces simultaneously. One skilled in the art would understand that the exemplary embodiment of FIG. 14G is not limited to displaying workspaces and may display more than two workspaces simultaneously.

Figure 14H:
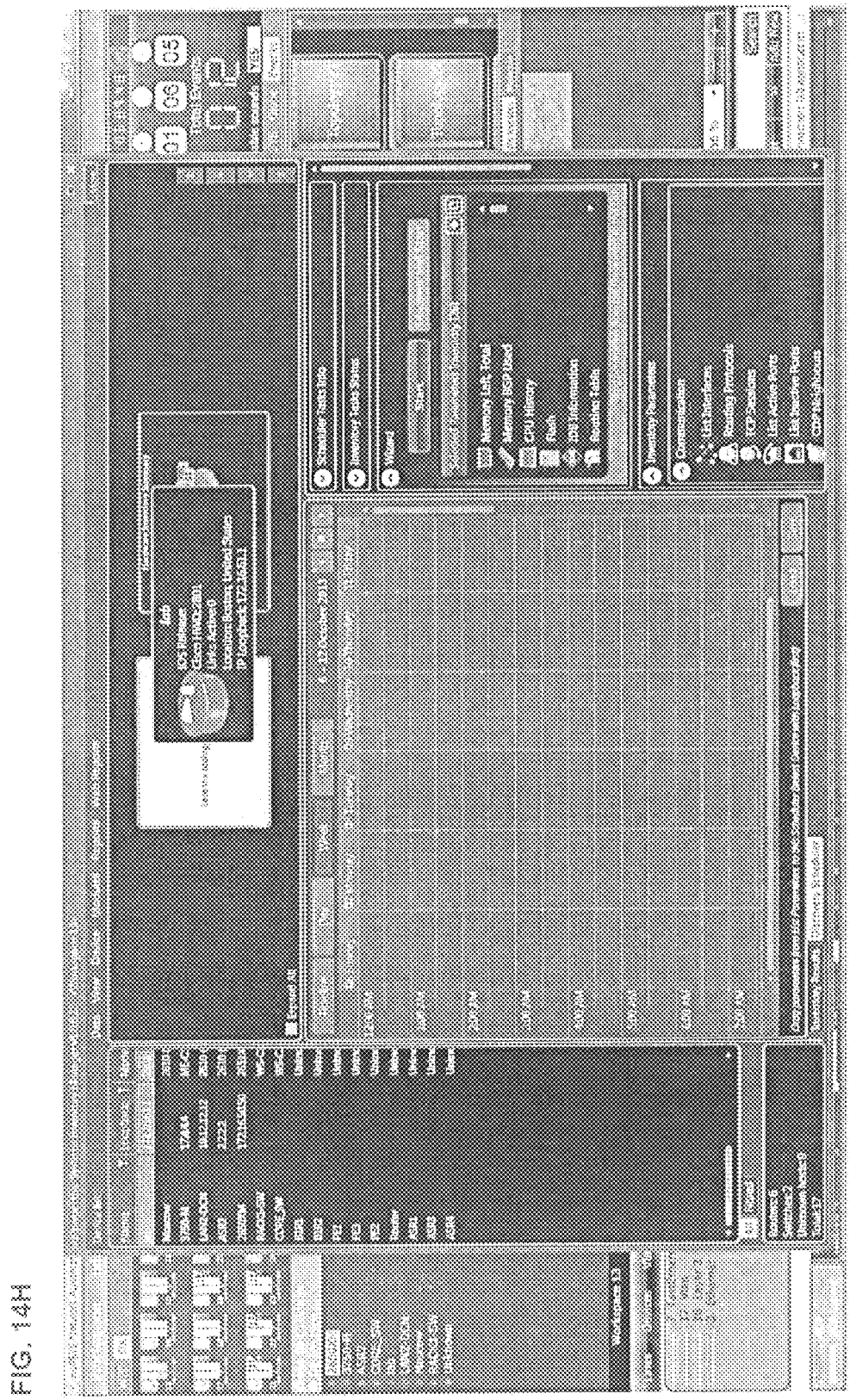

FIG. 14H shows an exemplary view of the main window layout according to an exemplary embodiment. The exemplary embodiment of FIG. 14H illustrates an inventory manager window that provides information on all devices within a selected workspace. The user may access the inventory manager window by selecting an "Inventory" tab in the main window layout. The inventory manager window according to the exemplary embodiment may include a list of devices within the workspace, a window that displays information about a particular device selected from the list of devices, and a schedule for executing a discovery algorithm on the devices within the workspace. The inventory manager window may also group devices within the workspace by type, e.g., routers, switches, etc., and display the total number of each type of device within the workspace.

Figure 14I:
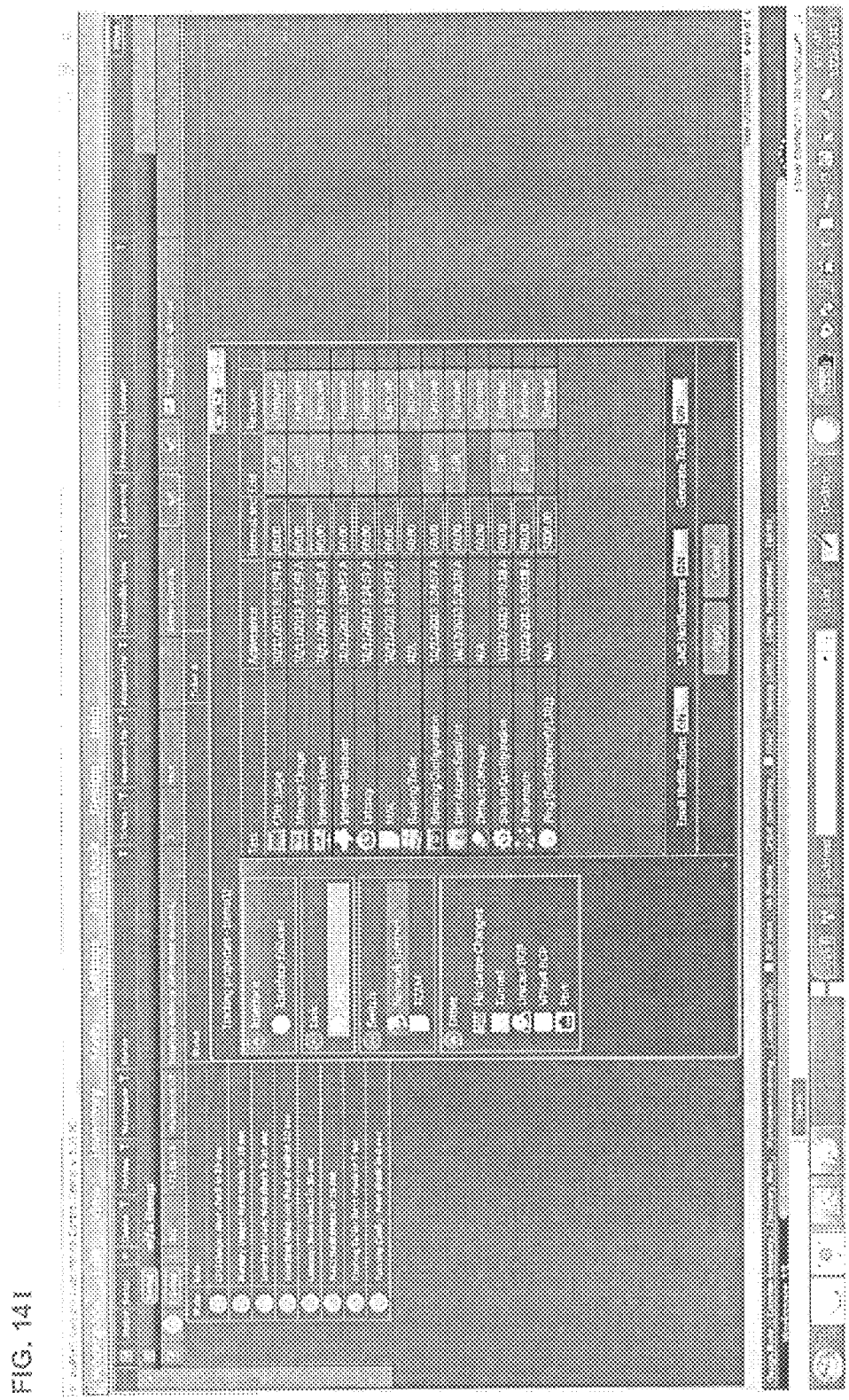

FIG. 14I shows an exemplary view of the main window layout according to an exemplary embodiment. The exemplary embodiment of FIG. 14I illustrates a tracking window, which the user may access by selecting a "Tracking Center" tab on the main window layout. The tracking window allows a user to track activity across an entire workspace. In addition to monitoring the workspace, an administrator can actively troubleshoot problems as they arise in real-time. For example, an administrator may modify a routing table to re-route packets in the event of a disruption on a portion of the network.

FIG. 15 illustrates a molecule window layout according to an exemplary embodiment. Referring to FIG. 15, the exemplary layout may include a molecule 3D topology view 1505, which provides a 3D visualization of the client network with discovered devices represented by spheres and the connections between the devices represented by lines, thus creating a "molecule" view. As in FIG. 14, the connections between the discovered devices may be represented by different color lines corresponding to the type of connection between devices. The user is also able to rotate the molecule 3D topology to view the network from any desired angle.

The exemplary molecule layout may also include a network availability gauge 1510 that represents the current traffic on the network as compared to the maximum traffic the network is capable of handling. The network availability gauge 1510 may, for example, be in the form of a speedometer-type gauge, and measure network availability as a percentage of the network's maximum capacity.

The exemplary molecule layout may also include an attribute window 1515 that contains various attributes of the selected workspace. These attributes may include, without limitation, monitoring devices, connection information, trace route, search, monitoring links, and latencies. In the exemplary monitoring algorithms described in FIGS. 8-12, the various records that are selected from the attribute list may be selected from the corresponding attribute list shown in the attribute window 1515.

The exemplary molecule window layout may further include a legend window 1520 that describes the various connections that are capable of being displayed in the molecule 3D topology view 1505. For example, the legend window 1520 may indicate that an orange connection between two devices represents an Ethernet connection. The molecule layout may also include a selected information window 1525, which includes information about a device or connection selected by the user, a summary window 1530, which includes information regarding how many devices in the workspace are functioning, how many devices are not functioning properly, and/or an inventory of all discovered devices and interfaces. The molecule layout may also include a device tree view 1535 that displays a structured list of devices in the client network.

Figure 15A:
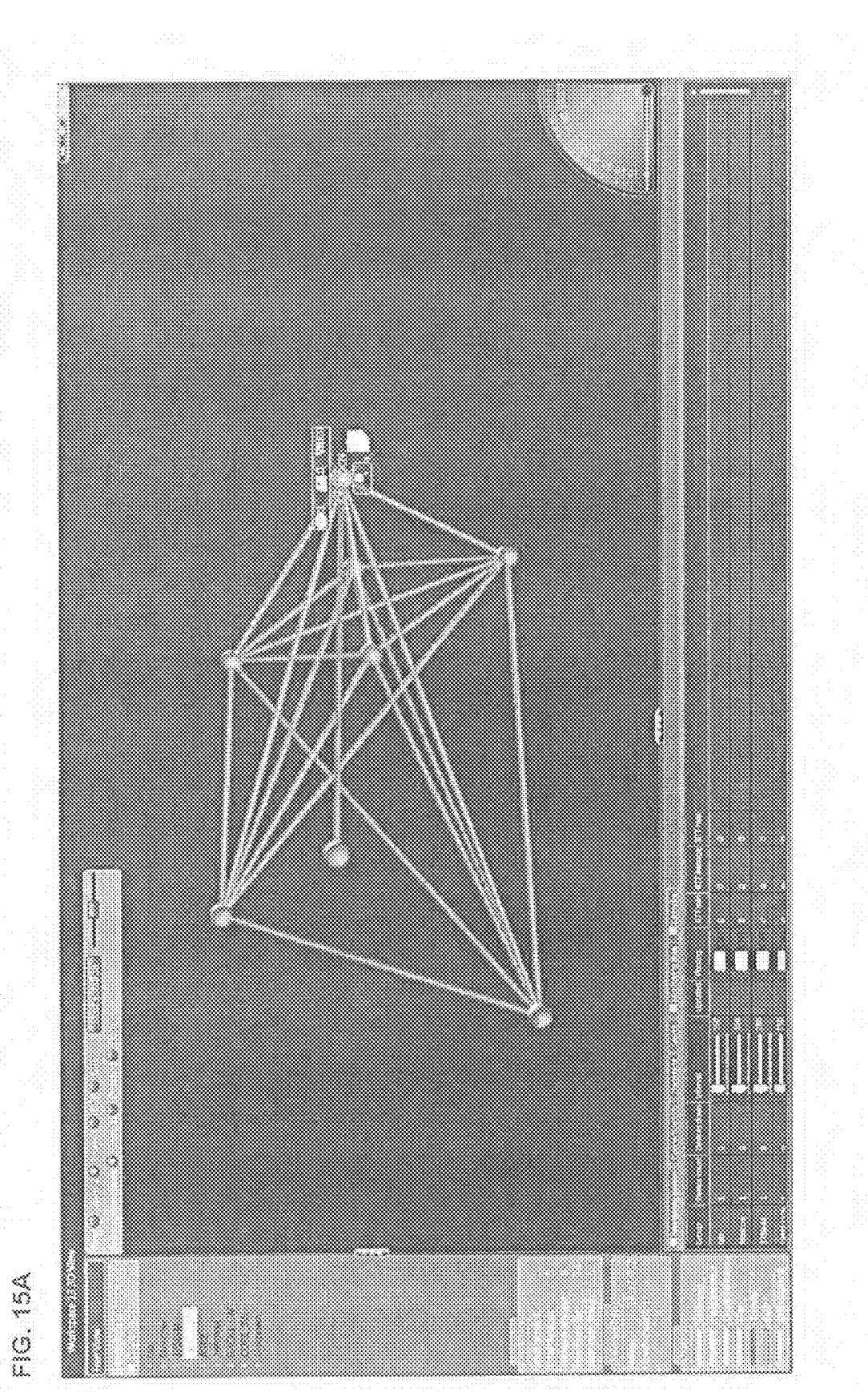

FIG. 15A shows an exemplary view of the molecule window layout according to an exemplary embodiment. As shown in FIG. 15A, the devices within the workspace and the connections between such devices are displayed in a molecule format. The molecule format may be displayed three-dimensionally or stereoscopically.

The client application may display one or both of the molecule layout of FIG. 15 and the main window layout of FIG. 14. The client application may also simultaneously display multiple molecule layouts for different workspaces, multiple main window layouts for different workspaces, or a combination of molecule and main window layouts for different workspaces. Thus, a user is able to conveniently view multiple workspaces in multiple representations from a single interface.

One skilled in the art would understand that the windows in the main window layout and the molecule window layout may be arranged in various configurations without departing from the inventive aspect of the exemplary embodiment. Moreover, in both the main window layout and the molecule window layout, an object may represent more than one detected device, and the user may expand the object to view the devices represented by the object. In addition, through either the main window layout or the molecule window layout, the user is able to select a displayed object and view information such as the physical location, past problems, IP address, etc. of the device represented by the object. The user is also able to modify this information.

The client application also may include an inventory function that allows a user to easily view an inventory of the devices in the network. By knowing the physical location of each device in the network, the client application is able to provide an inventory or all devices at a particular location, and/or can provide an inventory of a particular type of device that indicates the physical location of each device.

The client application also allows a user to save network topologies in order to provide a snapshot of a network topology at any given time. This allows the user to view a temporal progression of a network topology to visualize how the topology has changed over time, thus adding an additional dimension to the 2D and 3D renderings described above.

The client application may also include a help desk component which keeps a record of all network control/management actions performed on the network. The help desk component allows a user to view, for example, a history of actions performed on the network and/or devices in the network, who performed the actions, and when the actions were performed, among other information. The help desk component may also generate a QR code, or other type of encoding, within which this information is encoded. The user may read the QR code with a QR code reader, such as an application on a smartphone, to obtain the historical and/or present information relating to the network or a device within the network. The helpdesk component may be integrated as a wrapper around the system, such that the helpdesk interfaces with the client application and the monitoring server.

The client application discovers devices within the network and collets information about each discovered device. A dynamic database may be created for each detected device, storing information and files related to each device, such as architecture diagrams, photographs, etc. related to the device. These dynamic databases may be connected to a master database that stores information about the entire network topology.

FIG. 16 is an architectural diagram of a network visualization system according to another exemplary embodiment. The architecture of FIG. 16 is similar to the architecture shown in FIG. 1, and a description of like components will not be repeated here. Referring to FIG. 16, the network visualization system of FIG. 16 includes similar components to the FIG. 1 system, but also includes Sniffer Servers 1 through N 160. Sniffer Servers 1 through N 160 are connected to client networks 1 through N 100 and workspaces 1 through N 150 of client application 140, respectively. Sniffer Servers 1 through N 160 monitor and collect all traffic, e.g., signaling, data, content, communications, etc., on client networks 1 through N 100, respectively. Sniffer Servers 1 through N 160 transmit the collected traffic data to client application 140. For example, traffic data may be collected using a Remote Switched Port Analyzer (RSPAN) on a switch or tap devices that intercept the traffic data and send the traffic data to the Sniffer Servers 1 through N 160. Client application 140 may render the received traffic data so that the user can visualize the traffic occurring on a particular network. The transmission and visualization of the traffic data may occur in real-time, allowing the user to visualize the current traffic on the network. The traffic data may be rendered according to the process of FIG. 13 described above.

In addition, the traffic data collected by Sniffer Servers 1 through N 160 may be stored in databases 1 through N 130, respectively. The traffic data may be indexed according to various characteristics of the traffic data in order to make the traffic data searchable. According to an exemplary embodiment, the traffic data may be indexed according to source address, destination address, and/or timestamp. In addition, the traffic data may be indexed based on the network performance, transmission of particular file types, and/or user behavior. Databases 1 through N 130 may include Hadoop indexing databases, STORM and/or HBase databases. One skilled in the art will understand that these criteria are merely exemplary and that the traffic data may be indexed according to other characteristics associated with the traffic data.

Client application 140 may include a search manager that allows a user to search the indexed traffic data stored in databases 1 through N 130. Search manager may provide a search interface that allows a user to search the indexed traffic data according to one or more search criteria. For example, if a user knows that a problem occurred on the network at 1:30pm, the user could search the indexed traffic data by timestamp to determine which packets transmitted on the network may be associated with the problem. The results of the search may then be rendered by DX renderer 142. For example, the results of the search may be graphically rendered in a geographic representation showing the physical location of the source and/or destination of an indexed packet or communication.

The client application 140 may also provide a service desk interface for users to submit requests for additional visualization features. For example, the client application may allow the user to type a description of the visualization feature the user desires to be implemented. Requests may be submitted privately, or the requests may be displayed on the main window layout of FIG. 14 or the molecule window layout window of FIG. 15. The display window may include a description of the requested feature and a status indicator that indicates the development status of the requested feature. Once the requested feature is completed, the feature may be made available to the user who requested the feature. In addition, the completed feature may continue to be displayed on the status indicator or may be displayed on a separate window listing requested features that have been completed. The completed features may be made available for purchase by other users of the system. In this way, users of the system may customize the system by requesting new features, and may benefit from features requested by other users of the system.

Figure 17A:
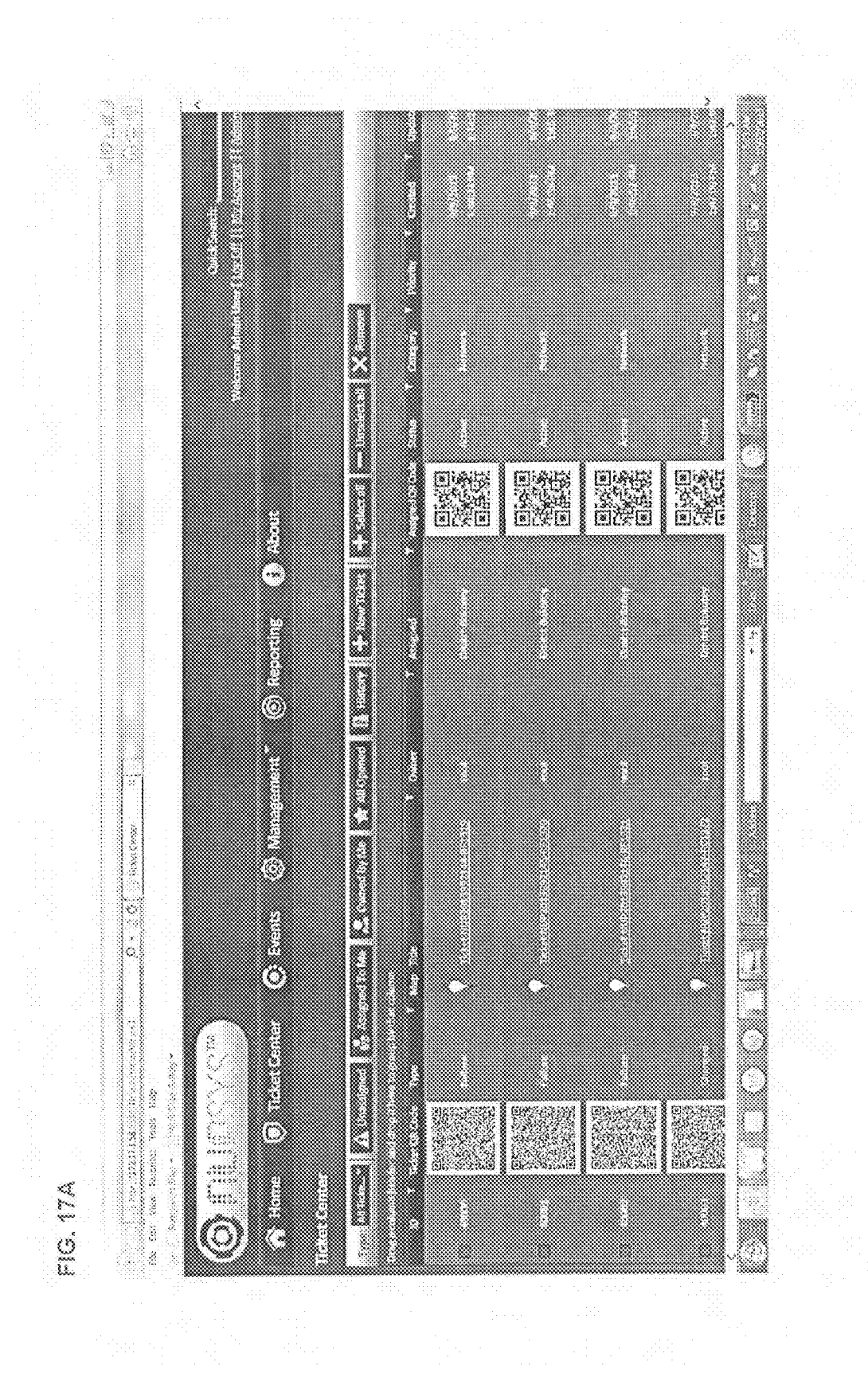
FIGS. 17A through 17E illustrate a service desk interface according to several exemplary embodiments.

FIG. 17A is an exemplary layout of the service desk interface according to an exemplary embodiment. Referring to FIG. 17, the service desk interface may include a list of items or "tickets" that correspond to features that have been requested by customers. Each ticket may be assigned an ID number 1701, a ticket QR code 1702, and a title 1703. The ticket QR code 1702 may be read by a QR code reader that is well known in the art, to reveal information about the ticket, such as the functionality requested, the entity who requested the features, and when the request was submitted. One skilled in the art would understand that the ticket QR code 1702 may also contain other information relating to the ticket. The service desk interface may also include a map column 1704, which when selected shows the physical location of the device or devices related to the ticket. The service disk interface may also identify the individual 1705 assigned to each ticket, and indicate the status 1706 of each ticket. The service desk interface may also include an Assigned QR code 1707, which is encoded identification of the person responsible for addressing the ticket. The service desk interface may also indicate a type 1708, category 1709 and priority 1710 for each ticket.

Figure 17B:
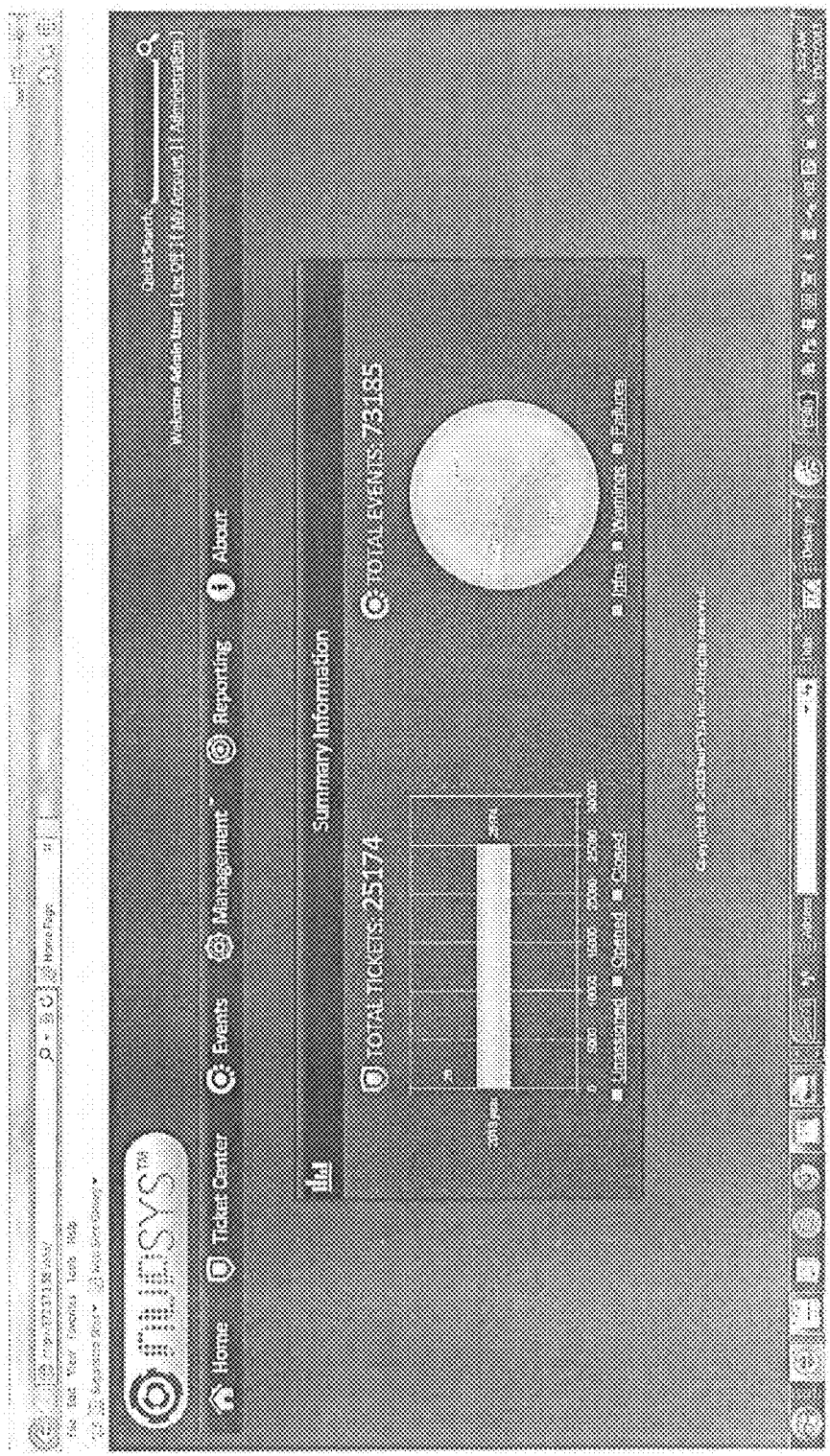

FIG. 17B is an exemplary embodiment of a summary screen of the service desk interface according to an exemplary embodiment. On the left side of the exemplary summary screen, the total number of tickets that have been generated, including an indication of how many tickets have been opened, how many tickets have been closed, and how many tickets remain unassigned. On the right side of the exemplary summary screen, a summary of the total number of events that have occurred on all of the monitored networks is shown. This event summary may indicate the number warnings, failures, and notifications (infos) that have occurred. One skilled in the art would understand that the summary information may be limited to the tickets and/or events within a particular workspace or workspaces. In addition, although the summaries are shown in bar graph and pie chart format, one skilled in the art would understand the summaries may be expressed in other formats.

Figure 17C:
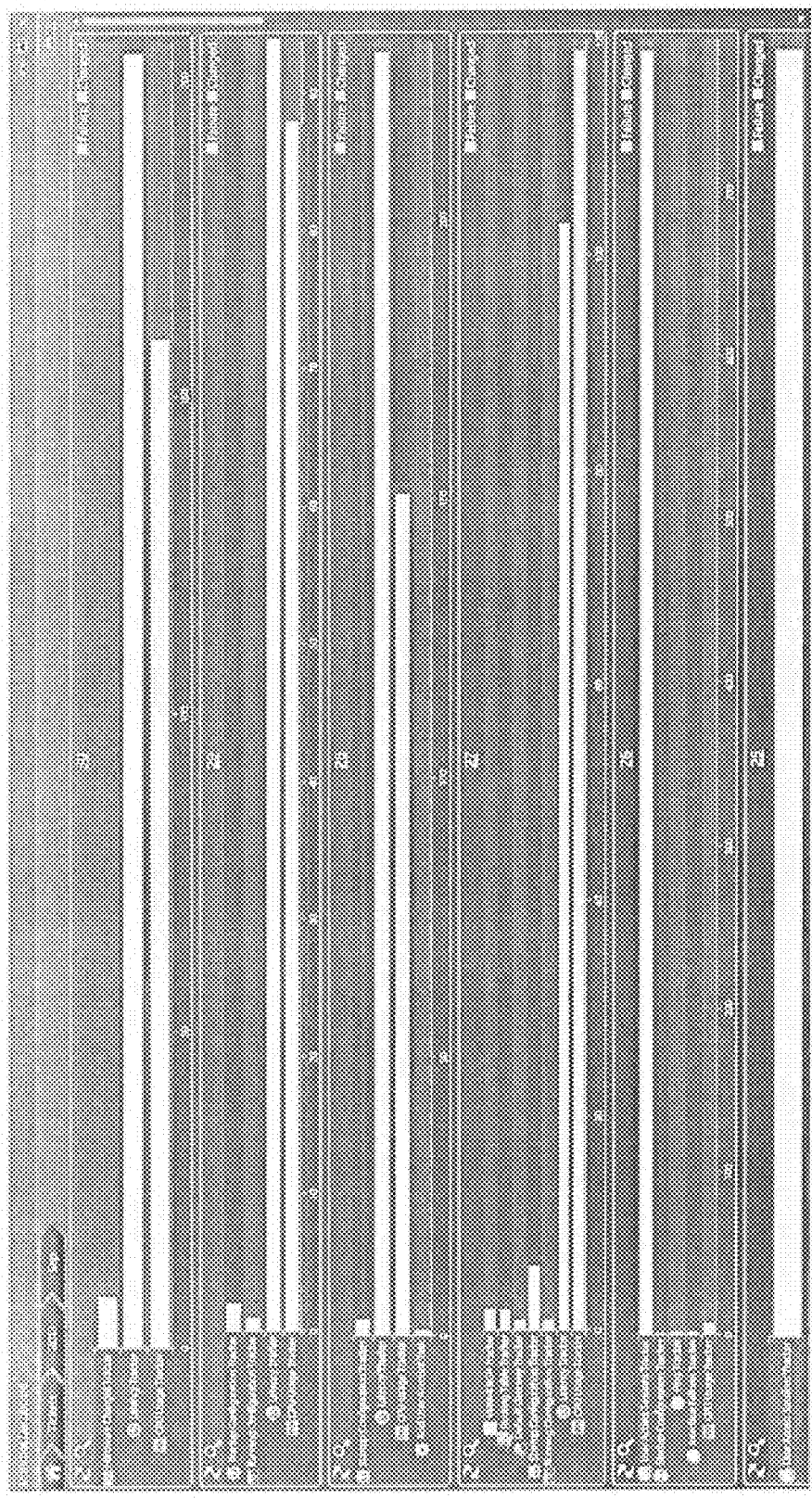

FIG. 17C illustrates a statistics dashboard of the service desk interface according to an exemplary embodiment. The exemplary statistics dashboard shown in FIG. 17C provides a summary of network activity for a given workspace on a daily basis. For example, if the user selects a year and month, the statistics dashboard of the exemplary embodiment may show various workspace statistics for each day within the selected month. These statistics may include, without limitation, network latency, CPU usage of one or more devices within the workspace, number of hardware changes, and configuration changes.

Figure 17D:
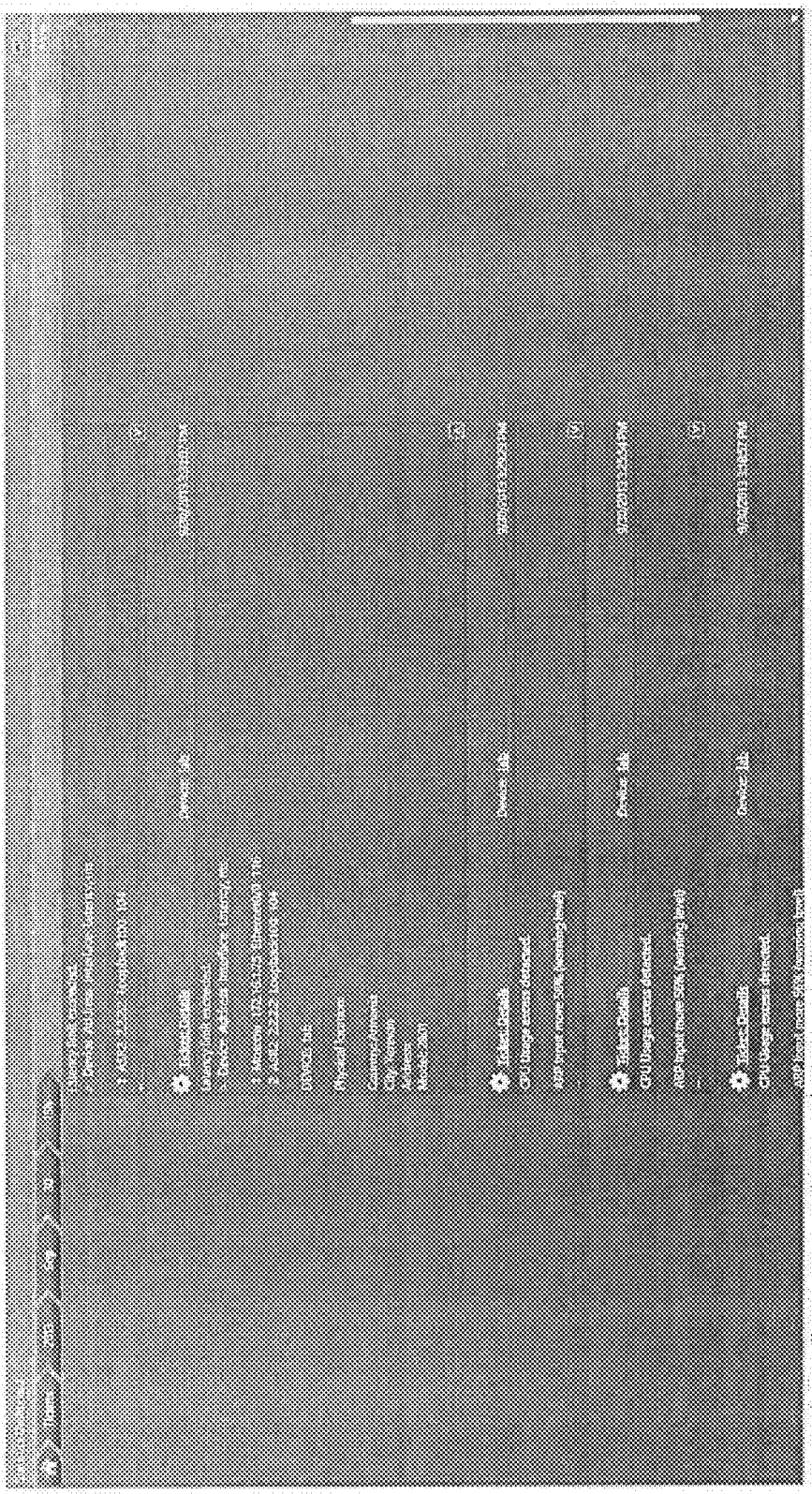

FIG. 17D illustrates an hourly ticket summary component of the statistics dashboard of FIG. 17C according to an exemplary embodiment. As shown in FIG. 17D, the user may select a particular hour within a selected day to view all of the tickets that were generated within the selected hour. The hourly ticket summary may include a description of each ticket, the physical location of the device or devices related to each ticket, as well as other descriptive information related to the ticket. The hourly ticket summary may also include for each ticket a hyperlink to a more complete description of each ticket, on exemplary embodiment of which is shown in FIG. 17E.

Figure 17E:
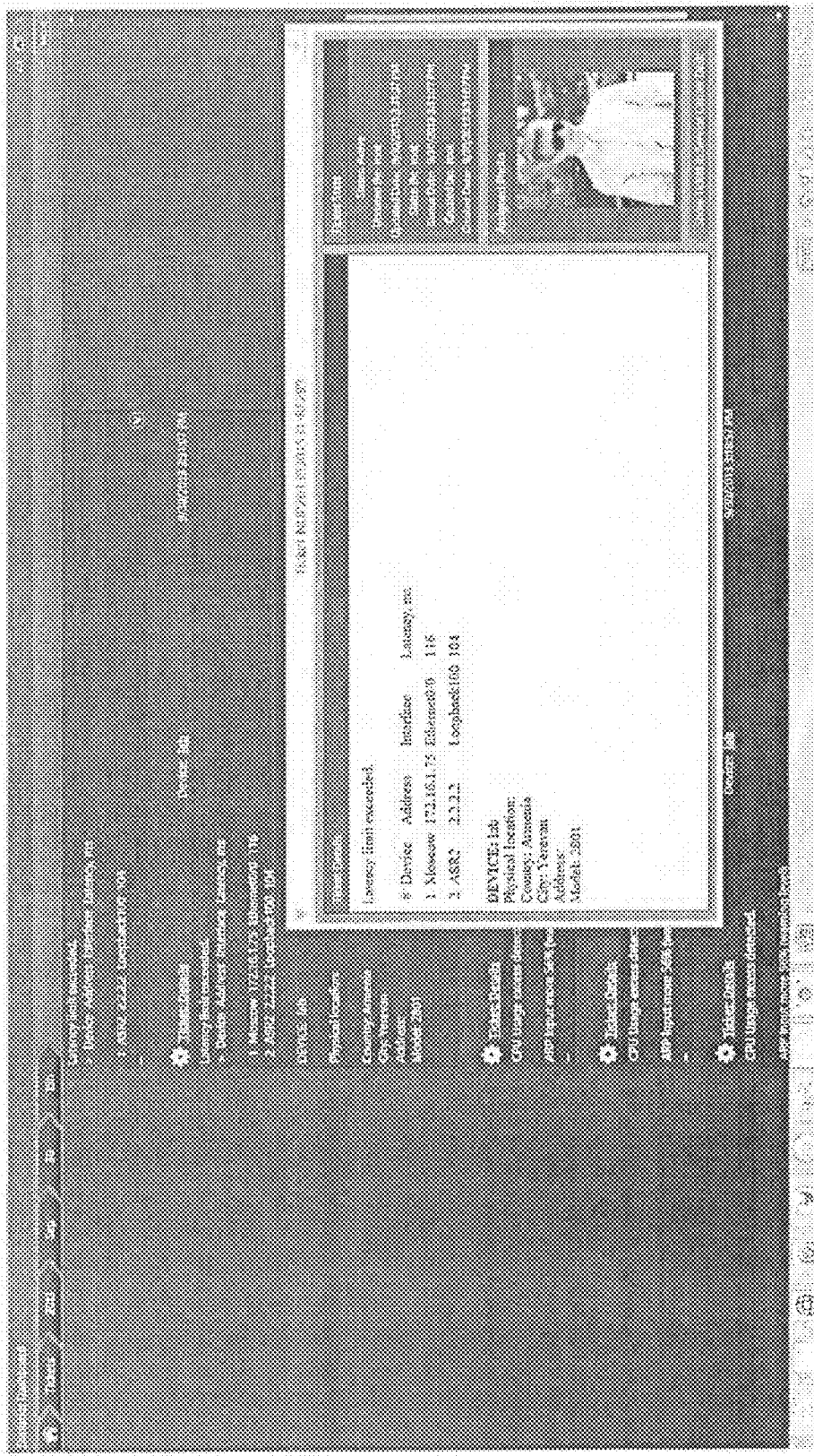

Referring to FIG. 17E, when the user clicks on the hyperlink for a ticket, a ticket detail window provides various details associated with the ticket, such as the devices related to the ticket, the IP address and physical location of each device, the status of the ticket, and the individual assigned to address the ticket. One skilled in the art will understand that additional information may also be provided in the ticket detail window.

Although a few exemplary embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A network visualization system comprising:
   a monitoring server that discovers devices in a client network; and
   a client application comprising a discovery controller and a rendering unit;
   wherein the discovery controller receives a list of discovered devices that were discovered by the monitoring server; and
   wherein the rendering unit graphically renders the discovered devices using DirectX.

2. The network visualization system of claim 1,
   wherein if a CPU usage of a first device in the client network is less than a CPU usage threshold, the monitoring server obtains additional information about the first device, and if the CPU usage of the first device is greater than or equal to the CPU usage threshold, the monitoring server does not obtain additional information about the first device.

3. The network visualization system of claim 2, wherein the additional information comprises one or more of device model, processor ID, operating system version, device interfaces, SNMP locations, SNMP contact, IP routes, CDP neighbors, Border Gateway Protocol, Virtual Routing Field, Multi-Protocol Label Switching, Hot Standby Routing Protocol, Virtual Router Redundancy Protocol, and Gateway Load Balancing Protocol.

4. The network visualization system of claim 1,
   wherein the monitoring server comprises a plurality of monitoring servers that simultaneously discover devices in a corresponding plurality of client networks and discover connections between the discovered devices; and
   wherein the discovery controller receives one or more lists of devices discovered in the plurality of client networks.

5. The network visualization system of claim 4,
   wherein the rendering unit graphically renders the devices discovered in the plurality of client networks and the connections between the discovered devices using DirectX.

6. The network visualization system of claim 5,
   wherein the rendering unit graphically renders the devices discovered in the plurality of client networks in a plurality of windows that respectively correspond to the plurality of client networks.

7. The network visualization system of claim 5, wherein the monitoring server monitors a status of one or more devices discovered in the client network; and
   wherein the rendering unit renders a status change indicator if it is determined that a status of one or more devices discovered in the client network, or a connection between said one or more devices, has changed.

8. The network visualization system of claim 5, wherein the rendering unit renders the devices discovered in the plurality of client networks and the connections between the discovered devices in a stereoscopic graphical user interface.

9. The network visualization system of claim 8, wherein the rendering unit permits the user to move the discovered devices on the graphical user interface, and updates the connections between the discovered devices as the discovered devices are moved.

10. The network visualization system of claim 1, further comprising:
    one or more device databases, each of which is associated with a corresponding device of the devices discovered by the monitoring server, and stores information relating to the corresponding device; and
    a master database that stores all of the information stored in the one or more device databases.

11. The network visualization system of claim 1,
    wherein the monitoring server determines the physical location of at least one device discovered in the client network; and
    wherein the client application is configured to display an inventory of discovered devices based on the determined physical location of the at least one device.

12. The network visualization system of claim 1, wherein the monitoring server performs at least one of monitoring border gateway protocol neighbors of one or more discovered devices, monitoring states of discovered virtual IP addresses, monitoring a state of one or more discovered devices, monitoring links between the discovered devices, and monitoring latencies between two discovered devices.

13. The network visualization system of claim 12, wherein the monitoring a state of one or more discovered devices comprises monitoring one or more of interface loads, route count, memory used, available memory, CPU usage, uptime, and TCAM count.

14. The network visualization system of claim 1, wherein the rendering unit graphically renders the discovered devices stereoscopically.

15. A method for visualizing a computer network using a network visualization system, the method comprising:
    discovering, by a monitoring server of the network visualization system, devices in a client network;
    receiving, by a discovery controller of the network visualization system, a list of discovered devices; and rendering, by a rendering unit of the network visualization system, the discovered devices using DirectX.

16. The method of claim 15, further comprising:
obtaining, if a CPU usage of a first device is less than a CPU usage threshold, additional information about the first device, and if the CPU usage of the first device is greater than or equal to the CPU usage threshold, the discovering step does not obtain additional information about the first device.

17. The method of claim 16, wherein the additional information comprises one or more of device model, processor ID, operating system version device interfaces, SNMP locations, SNMP contact, IP routes, CDP neighbors, Border Gateway Protocol, Virtual Routing Field, Multi-Protocol Label Switching, Hot Standby Routing Protocol, Virtual Router Redundancy Protocol, and Gateway Load Balancing Protocol.

18. The method of claim 15, wherein the discovering step comprises using a plurality of monitoring servers to simultaneously discover devices in a corresponding plurality of client networks, and discovering connections between the discovered devices; and
wherein the receiving comprises receiving one or more lists of devices discovered in the plurality of client networks.

19. The method of claim 18, wherein the rendering comprises rendering the devices discovered in the plurality of client networks and the connections between the discovered devices using DirectX.

20. The method of claim 19, wherein the rendering comprises graphically rendering the devices discovered in the plurality of client networks in a plurality of windows that respectively correspond to the plurality of client networks.

21. The method of claim 19, further comprising:
monitoring a status of one or more devices discovered in the client network; and
rendering a status change indicator if it is determined that a status of one or more devices discovered in the client network, or a connection between said one or more devices, has changed.

22. The method of claim 19, wherein the rendering comprises rendering the devices discovered in the plurality of client networks and the connections between the discovered devices in a stereoscopic graphical user interface.

23. The method of claim 22, wherein the rendering comprises rendering the devices discovered in the plurality of client networks and the connections between the discovered devices such that a user is able to move the discovered devices in the graphical user interface, and the connections between the discovered devices are updated as the discovered devices are moved.

24. The method of claim 15, further comprising storing in one or more device databases information relating to one or more of the discovered devices, wherein each of the one or more device databases corresponds to one of the discovered devices; and
storing all of the information stored in the one or more device databases in a master database.

25. The method of claim 15, further comprising:
determining the physical location of at least one device discovered in the client network; and
displaying an inventory of discovered devices based on the determined physical location of the at least one device.

26. The method of claim 15, further comprising:
monitoring at least one of border gateway protocol neighbors of one or more discovered devices, states of discovered virtual IP addresses, a state of one or more discovered devices, links between the discovered devices, and latencies between two discovered devices.

27. The method of claim 26, wherein the monitoring a state of one or more discovered devices comprises monitoring one or more of interface loads, route count, memory used, available memory, CPU usage, uptime, and TCAM count.

28. The method of claim 15, wherein the rendering comprises rendering the discovered devices stereoscopically.

* * * * *